US012020654B2

(12) United States Patent
Tak

(10) Patent No.: US 12,020,654 B2
(45) Date of Patent: Jun. 25, 2024

(54) IMAGE DISPLAY DEVICE AND METHOD FOR CONTROLLING THE SAME

(71) Applicant: LG ELECTRONICS INC., Seoul (KR)

(72) Inventor: Sungwoo Tak, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/879,262

(22) Filed: Aug. 2, 2022

(65) Prior Publication Data

US 2023/0130976 A1 Apr. 27, 2023

(30) Foreign Application Priority Data

Oct. 25, 2021 (KR) ........................ 10-2021-0142503

(51) Int. Cl.
*G09G 3/34* (2006.01)

(52) U.S. Cl.
CPC ............. *G09G 3/3406* (2013.01); *G09G 3/34* (2013.01); *G09G 2320/0606* (2013.01);
(Continued)

(58) Field of Classification Search
CPC ................... G09G 3/3406; G09G 3/34; G09G 2320/0606; G09G 2320/0626;
(Continued)

(56) References Cited

U.S. PATENT DOCUMENTS 8,223,117 B2 * 7/2012 Ferguson ............. G09G 3/3406 345/207
2005/0151716 A1 * 7/2005 Lin .......................... G09G 3/20 345/102

(Continued)

FOREIGN PATENT DOCUMENTS

KR 10-0833951 5/2008
KR 10-2010-0138451 12/2010

(Continued)

OTHER PUBLICATIONS

PCT International Application No. PCT/KR2022/011018, International Search Report dated Jan. 31, 2023, 8 pages.

*Primary Examiner* — William Boddie
*Assistant Examiner* — Saifeldin E Elnafia
(74) *Attorney, Agent, or Firm* — LEE, HONG, DEGERMAN, KANG & WAIMEY

(57) ABSTRACT

The present disclosure relates to an image display device and method for controlling the same, by which a display brightness may be appropriately adjusted in accordance with a change in an ambient light brightness irrespective of an average ambient light brightness. According to one aspect of the present disclosure, provided is an image display device including a display, an ambient light detecting sensor, and a controller configured to determine a brightness of the display according to an ambient light brightness detected in real time by the ambient light detecting sensor based on a first graph line for a display brightness over an ambient light brightness and determine whether to adjust the first graph line based on a maximum brightness operation time of the display.

10 Claims, 19 Drawing Sheets

(52) U.S. Cl.
CPC . *G09G 2320/0626* (2013.01); *G09G 2320/08* (2013.01); *G09G 2354/00* (2013.01); *G09G 2360/141* (2013.01); *G09G 2360/144* (2013.01)

(58) Field of Classification Search
CPC ........... G09G 2320/08; G09G 2354/00; G09G 2360/141; G09G 2360/144
See application file for complete search history.

(56) References Cited

U.S. PATENT DOCUMENTS

| | | | | |
|---|---|---|---|---|
| 2008/0165203 | A1* | 7/2008 | Pantfoerder | G06F 3/0416<br>345/589 |
| 2009/0079721 | A1* | 3/2009 | Gettemy | G09G 3/3406<br>345/207 |
| 2020/0279541 | A1* | 9/2020 | Pantfoerder | G09G 5/10 |
| 2021/0020140 | A1* | 1/2021 | Li | G09G 5/10 |

FOREIGN PATENT DOCUMENTS

| | | |
|---|---|---|
| KR | 10-2012-0023529 | 3/2012 |
| KR | 10-2012-0042004 | 5/2012 |
| KR | 10-2017-0098120 | 8/2017 |

* cited by examiner

--PRIOR ART--

M1, M2, M3 : Backlight brightness Max setting
V1, V2, V3 : Backlight brightness variable range

FIG. 4

| Ambient light brightness (lux) | Backlight brightness(%) | | |
|---|---|---|---|
| | Graph line 1 (bright place) | Graph line 2 (normal) | Graph line 3 (dark place) |
| 10 | 6 | 0 | 0 |
| 20 | 12 | 0 | 0 |
| 30 | 18 | 8 | 0 |
| 40 | 25 | 16 | 0 |
| 50 | 31 | 25 | 13 |
| 60 | 37 | 33 | 25 |
| 70 | 44 | 41 | 38 |
| 80 | 50 | 50 | 50 |
| 90 | 56 | 58 | 63 |
| 100 | 62 | 66 | 75 |
| 125 | 69 | 75 | 88 |
| 150 | 75 | 83 | 100 |
| 175 | 81 | 91 | 100 |
| 200 | 87 | 100 | 100 |
| 250 | 94 | 100 | 100 |
| 300 | 100 | 100 | 100 |

(18-1)

(18-2)

IMAGE DISPLAY DEVICE AND METHOD FOR CONTROLLING THE SAME

Pursuant to 35 U.S.C. § 119(a), this application claims the benefit of earlier filing date and right of priority to Korean Patent Application No. 10-2021-0142503, filed on Oct. 25, 2021, the contents of which are hereby incorporated by reference herein in its entirety.

BACKGROUND OF THE DISCLOSURE

Field of the Disclosure

The present disclosure relates to an image display device and method for controlling the same to implement a use of the image display device in further consideration of user's convenience.

Discussion of the Related Art

An image display device includes, for example, a function for receiving and processing a broadcast image viewable by a user. The image display device displays a broadcast, which is selected by the user from among broadcast signals transmitted from a broadcast station, on a display. Currently broadcasters are transitioning from analog to digital broadcasting.

Digital broadcasting refers to broadcasting of digital video and audio signals. The digital broadcast has low data loss due to robustness against external noise, error correction, high resolution and a high-definition screen, as compared with an analog broadcast. In addition, digital broadcasting can provide a bidirectional service unlike analog broadcasting.

In order to use digital broadcasting including a variety of content, the performance of an image display device has been improved and the function thereof has been diversified. As the performance of the image display device has been improved, various functions of the image display device, such as gaming, music listening or Internet shopping, using various applications can be performed in addition to a function for receiving an image signal from a broadcast station and viewing a broadcast.

An image display device may be usable in various places differing from each other in ambient light brightness. It is necessary for a display brightness of an image display device to be adjusted according to an ambient light brightness. However, in the case of a recently released image display device, as an average ambient light brightness at home is considered, a display brightness is configured to be adjusted according to a change in an ambient light brightness. When the image display device configured as described above is used in a place much brighter an ambient light in a normal home (e.g., a store, an office, an outdoor, etc.), there is a problem in that the display brightness may not be appropriately adjusted according to a change in ambient light brightness.

SUMMARY OF THE DISCLOSURE

Accordingly, embodiments of the present disclosure are directed to an image display device and method for controlling the same that substantially obviate one or more problems due to limitations and disadvantages of the related art.

One object of the present disclosure is to provide an image display device and method for controlling the same, by which a display brightness may be appropriately adjusted in accordance with a change in an ambient light brightness irrespective of an average ambient light brightness.

Objects obtainable from the present disclosure are non-limited by the above-mentioned object. And, other unmentioned technical objects can be clearly understood from the following description by those having ordinary skill in the technical field to which the present disclosure pertains.

Additional advantages, objects, and features of the disclosure will be set forth in the disclosure herein as well as the accompanying drawings. Such aspects may also be appreciated by those skilled in the art based on the disclosure herein.

To achieve these objects and other advantages and in accordance with the purpose of the disclosure, as embodied and broadly described herein, an image display device according to one aspect of the present disclosure may include a display, an ambient light detecting sensor, and a controller configured to determine a brightness of the display according to an ambient light brightness detected in real time by the ambient light detecting sensor based on a first graph line for a display brightness over an ambient light brightness and determine whether to adjust the first graph line based on a maximum brightness operation time of the display.

If the maximum brightness operation time is equal to or greater than a first prescribed time, the controller may control the first graph line to be changed to a second graph line to decrease the maximum brightness operation time.

If the maximum brightness operation time is smaller than the first prescribed time, the controller may control the first graph line to be maintained.

If the maximum brightness operation time is equal to or smaller than a second prescribed time, the controller may control the first graph line to be changed to a third graph line to increase the maximum brightness operation time. The second prescribed time may be shorter than the first prescribed time.

If the maximum brightness operation time is greater than the second prescribed time, the controller may control the first graph line to be maintained.

The first to third graph lines may be preconfigured to form an intersecting point at a single point.

The controller may control a user interface, which is to change a shape of at least one of the first graph line, the second graph line, or the third graph line by moving the intersecting point, to be displayed on the display.

The controller may control a display brightness 100% saturated section of at least one of the first graph line, the second graph line, or the third graph line to be changed by moving the intersecting point.

Based on moving the intersecting point in a first direction, the controller may control the saturated section of at least one of the first graph line, the second graph line, or the third graph line to increase. Based on moving the intersecting point in a second direction opposite to the first direction, the controller may control the saturated section of at least one of the first graph line, the second graph line, or the third graph line to decrease The controller may control a second user interface, which is to select one of the first graph line, the second graph line, or the third graph line, to be displayed.

The first to third graph lines may be preconfigured to form intersecting points at two points.

In another aspect of the present disclosure, as embodied and broadly described herein, a method of controlling an image display device according to one aspect of the present disclosure may include determining a brightness of a display according to an ambient light brightness detected in real time by an ambient light detecting sensor based on a first graph line for a display brightness over an ambient light brightness and determining whether to adjust the first graph line based on a maximum brightness operation time of the display.

Accordingly, the effects of an image display device and method for controlling the same according to the present disclosure are described below.

According to at least one of embodiments of the present disclosure, it is advantageous in that a display brightness or a brightness of a backlight of an image display device may be appropriately automatically or manually adjusted according to a change in a brightness of ambient light detected in real time by considering an average ambient light brightness. If a time for the image display device to operate at 100%-saturated display brightness increases, the possibility of afterimage occurrence may increase due to degradation of an OLED display in an image display device. Such a problem may be prevented in advance.

According to at least one of embodiments of the present disclosure, it is advantageous in that a user may configure a reference for adjusting a display brightness or a backlight brightness of an image display device in accordance with a change in an ambient light brightness.

Further scope of applicability of the present disclosure will become apparent from the detailed description given hereinafter. However, it should be understood that the detailed description and specific examples, while indicating preferred embodiments of the disclosure, are given by illustration only, since various changes and modifications within the spirit and scope of the disclosure will become apparent to those skilled in the art from this detailed description.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. The above and other aspects, features, and advantages of the present disclosure will become more apparent upon consideration of the following description of preferred embodiments, taken in conjunction with the accompanying drawing figures. In the drawings:

FIG. 4 is a table digitalizing the graph of FIG. 3;

DETAILED DESCRIPTION OF THE DISCLOSURE

Description will now be given in detail according to exemplary aspects disclosed herein, with reference to the accompanying drawings. For the sake of brief description with reference to the drawings, the same or equivalent components may be provided with the same reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In the present disclosure, that which is well known to one of ordinary skill in the relevant art has generally been omitted for the sake of brevity. The accompanying drawings are used to help easily understand various technical features and it should be understood that the aspects presented herein are not limited by the accompanying drawings. As such, the present disclosure should be construed to extend to any alterations, equivalents and substitutes in addition to those which are particularly set out in the accompanying drawings.

The terms "module" and "unit" attached to describe the names of components are used herein to help the understanding of the components and thus should not be considered as having specific meanings or roles. Accordingly, the terms "module" and "unit" may be used interchangeably.

In addition, each of these components may be configured as a separate individual hardware module or implemented as two or more hardware modules. Two or more components may be implemented as a single hardware module, or in some cases, may be implemented as software.

Aspects of this disclosure will be described in detail with reference to the attached drawings, but it should be understood that they are merely illustrative of this disclosure and should not be interpreted as limiting the scope of this disclosure.

In addition, although the terms used in this disclosure are selected from generally known and used terms, some of the terms mentioned in the description of this disclosure, the detailed meanings of which are described in relevant parts of the description herein, have been selected at the discretion of the applicant. Furthermore, this disclosure must be understood, not simply by the actual terms used but by the meanings of each term lying within.

Figure 1:
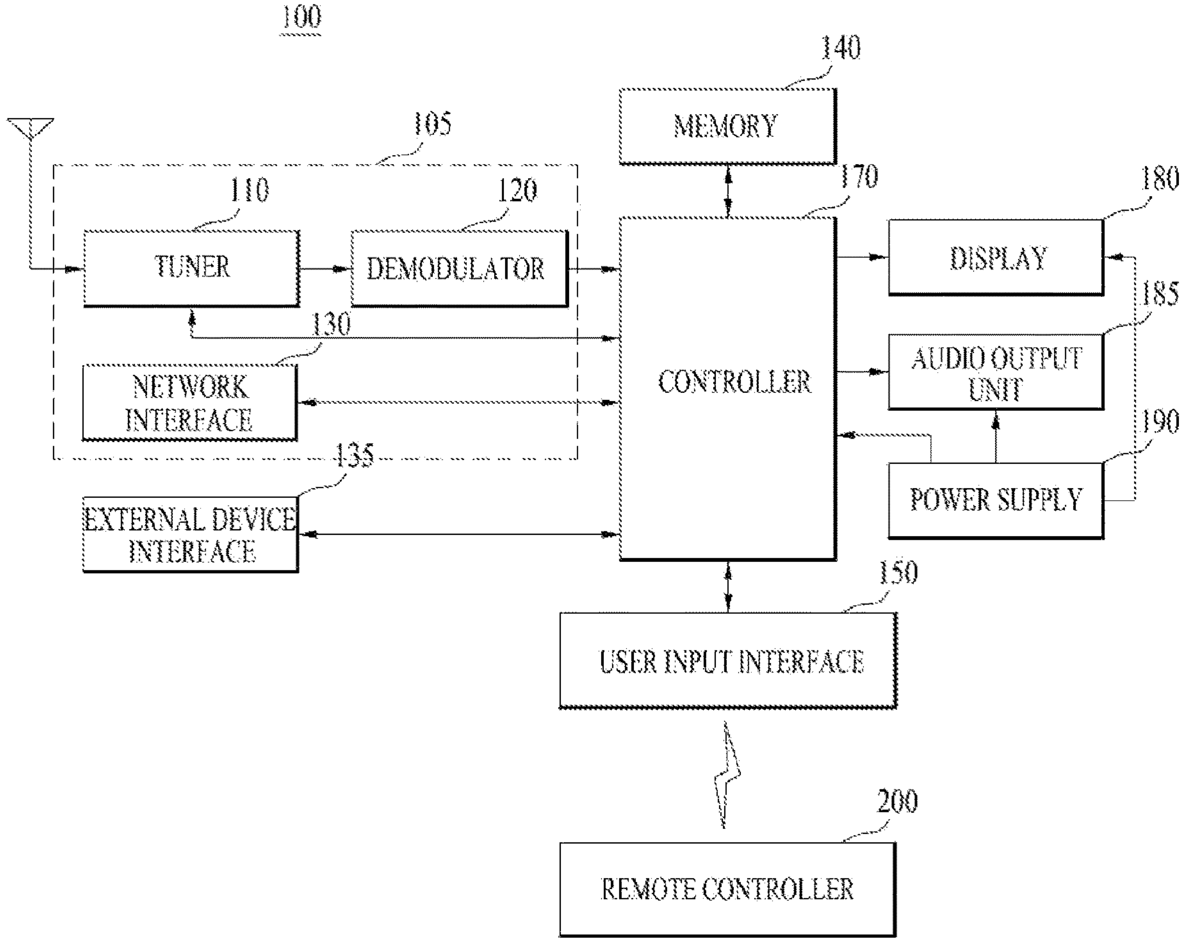
FIG. 1 is a schematic block diagram of an image display device according to one embodiment of the present disclosure.

FIG. 1 is a schematic block diagram of an image display device according to one embodiment of the present disclosure.

Referring to FIG. 1, an image display device 100 according to one aspect of this disclosure includes a broadcast receiver 105, an external device interface 135, a memory 140, a user input interface 150, a controller 170, a display 180, an audio output unit 185, a power supply 190, and a camera module (not shown).

The broadcasting receiver 105 may include a tuner 110, a demodulator 120 and a network interface 130. As needed, the broadcasting receiver 105 may be configured so as to include only the tuner 110 and the demodulator 120 or only the network interface 130.

The tuner 110 tunes to a Radio Frequency (RF) broadcast signal corresponding to a channel selected by a user from among a plurality of RF broadcast signals received through an antenna and downconverts the tuned RF broadcast signal into a digital Intermediate Frequency (IF) signal or an analog baseband video or audio signal.

More specifically, if the tuned RF broadcast signal is a digital broadcast signal, the tuner 110 downconverts the tuned RF broadcast signal into a digital IF signal DIF. On the other hand, if the tuned RF broadcast signal is an analog broadcast signal, the tuner 110 downconverts the tuned RF broadcast signal into an analog baseband video or audio signal CVBS/SIF. That is, the tuner 110 may be a hybrid tuner capable of processing not only digital broadcast signals but also analog broadcast signals. The analog baseband video or audio signal CVBS/SIF may be directly input to the controller 170.

The tuner 110 may be capable of receiving RF broadcast signals from an Advanced Television Systems Committee (ATSC) single-carrier system or from a Digital Video Broadcasting (DVB) multi-carrier system.

The tuner 110 may sequentially tune to a number of RF broadcast signals corresponding to all broadcast channels previously stored by a channel storage function from a plurality of RF signals received through the antenna and may downconvert the tuned RF broadcast signals into IF signals or baseband video or audio signals.

The demodulator 120 receives the digital IF signal DIF from the tuner 110 and demodulates the digital IF signal DIF.

For example, if the digital IF signal DIF is an ATSC signal, the demodulator 120 may perform 8-Vestigal Side-Band (VSB) demodulation on the digital IF signal DIF. The demodulator 120 may also perform channel decoding. For channel decoding, the demodulator 120 may include a Trellis decoder (not shown), a de-interleaver (not shown) and a Reed-Solomon decoder (not shown) so as to perform Trellis decoding, de-interleaving and Reed-Solomon decoding.

For example, if the digital IF signal DIF is a DVB signal, the demodulator 120 performs Coded Orthogonal Frequency Division Multiple Access (COFDMA) demodulation upon the digital IF signal DIF. The demodulator 120 may also perform channel decoding. For channel decoding, the demodulator 120 may include a convolution decoder (not shown), a de-interleaver (not shown), and a Reed-Solomon decoder (not shown) so as to perform convolution decoding, de-interleaving, and Reed-Solomon decoding.

The demodulator 120 may perform demodulation and channel decoding on the digital IF signal DIF, thereby obtaining a Transport Stream (TS). The TS may be a signal in which a video signal, an audio signal and a data signal are multiplexed. For example, the TS may be an MPEG-2 TS in which an MPEG-2 video signal and a Dolby AC-3 audio signal are multiplexed. An MPEG-2 TS may include a 4-byte header and a 184-byte payload.

In order to properly handle not only ATSC signals but also DVB signals, the demodulator 120 may include an ATSC demodulator and a DVB demodulator.

The TS output from the demodulator 120 may be input to the controller 170 and thus subjected to demultiplexing and A/V signal processing. The processed video and audio signals are output to the display 180 and the audio output unit 185, respectively.

The external device interface 135 may serve as an interface between an external device and the image display device 100. For interfacing, the external device interface 135 may include an A/V Input/Output (I/O) unit (not shown) and/or a wireless communication module (not shown).

The external device interface 135 may be connected to an external device such as a Digital Versatile Disc (DVD) player, a Blu-ray player, a game console, a camera, a camcorder, or a computer (e.g., a laptop computer), wirelessly or by wire. Then, the external device interface 135 externally receives video, audio, and/or data signals from the external device and transmits the received input signals to the controller 170. In addition, the external device interface 135 may output video, audio, and data signals processed by the controller 170 to the external device. In order to receive or transmit audio, video and data signals from or to the external device, the external device interface 135 includes the A/V I/O unit (not shown) and/or the wireless communication module (not shown).

The A/V I/O unit may include a Universal Serial Bus (USB) port, a Composite Video Banking Sync (CVBS) port, a Component port, a Super-video (S-video) (analog) port, a Digital Visual Interface (DVI) port, a High-Definition Multimedia Interface (HDMI) port, a Red-Green-Blue (RGB) port, and a D-sub port, in order to input the video and audio signals of the external device to the image display device 100.

The wireless communication module may perform short-range wireless communication with other electronic devices. For short-range wireless communication, the wireless communication module may use Bluetooth, Radio-Frequency IDentification (RFID), Infrared Data Association (IrDA), Ultra WideBand (UWB), ZigBee, and Digital Living Network Alliance (DLNA) communication standards.

The external device interface 135 may be connected to various set-top boxes through at least one of the above-described ports and may thus perform an I/O operation with the various set-top boxes.

The external device interface 135 may receive applications or an application list from an adjacent external device and provide the applications or the application list to the controller 170 or the memory 140.

The network interface 130 serves as an interface between the image display device 100 and a wired/wireless network such as the Internet. The network interface 130 may include an Ethernet port for connection to a wired network. For connection to wireless networks, the network interface 130 may use Wireless Local Area Network (WLAN) (i.e., Wi-Fi), Wireless Broadband (WiBro), World Interoperability for Microwave Access (WiMax), and High Speed Downlink Packet Access (HSDPA).

The network interface 130 may transmit data to or receive data from another user or electronic device over a connected network or another network linked to the connected network. Especially, the network interface 130 may transmit data stored in the image display device 100 to a user or electronic device selected from among users or electronic devices pre-registered with the image display device 100.

The network interface 130 may access a specific Web page over a connected network or another network linked to the connected network. That is, the network interface 130 may access a specific Web page over a network and transmit or receive data to or from a server. Additionally, the network interface 130 may receive content or data from a CP or an NP. Specifically, the network interface 130 may receive content such as movies, advertisements, games, VoD, and broadcast signals, and information related to the content from a CP or an NP. Also, the network interface 130 may receive update information about firmware from the NP and update the firmware. The network interface 130 may transmit data over the Internet or to the CP or the NP.

The network interface 130 may selectively receive a desired application among open applications over a network.

In an aspect of this disclosure, when a game application is executed in the image display device, the network interface 130 may transmit data to or receive data from a user terminal connected to the image display device through a network. In addition, the network interface 130 may transmit specific data to or receive specific data from a server that records game scores.

The memory 140 may store various programs necessary for the controller 170 to process and control signals, and may also store processed video, audio and data signals.

The memory 140 may temporarily store a video, audio and/or data signal received from the external device interface 135 or the network interface 130. The memory 140 may store information about broadcast channels by the channel storage function.

The memory 140 may store applications or a list of applications received from the external device interface 135 or the network interface 130.

In an aspect of this disclosure, when the image display device provides a game application, the memory 140 may store user-specific information and game play information of a user terminal used as a game controller.

The memory 140 may include, for example, at least one of a flash memory-type storage medium, a hard disk-type storage medium, a multimedia card micro-type storage medium, a card-type memory (e.g. a Secure Digital (SD) or eXtreme Digital (XD) memory), a Random Access Memory (RAM), or a Read-Only Memory (ROM) such as an Electrically Erasable and Programmable Read Only Memory (EEPROM). The image display device 100 may reproduce content stored in the memory 140 (e.g. video files, still image files, music files, text files, and application files) to the user.

While the memory 140 is shown in FIG. 1 as configured separately from the controller 170, to which this disclosure is not limited, the memory 140 may be incorporated into the controller 170, for example.

The user input interface 150 transmits a signal received from the user to the controller 170 or transmits a signal received from the controller 170 to the user.

For example, the user input interface 150 may receive control signals such as a power-on/off signal, a channel selection signal, and a screen setting signal from a remote controller 200 or may transmit a control signal received from the controller 170 to the remote controller 200, according to various communication schemes, for example, RF communication and IR communication.

For example, the user input interface 150 may provide the controller 170 with control signals received from local keys (not shown), such as inputs of a power key, a channel key, and a volume key, and setting values.

Also, the user input interface 150 may transmit a control signal received from a sensor unit (not shown) for sensing a user gesture to the controller 170 or transmit a signal received from the controller 170 to the sensor unit. The sensor unit may include a touch sensor, a voice sensor, a position sensor, a motion sensor, etc.

The controller 170 may demultiplex the TS received from the tuner 110, the demodulator 120, or the external device interface 135 into a number of signals and process the demultiplexed signals into audio and video data.

The video signal processed by the controller 170 may be displayed as an image on the display 180. The video signal processed by the controller 170 may also be transmitted to an external output device through the external device interface 135.

The audio signal processed by the controller 170 may be audibly output through the audio output unit 185. Also, the audio signal processed by the controller 170 may be transmitted to the external output device through the external device interface 135.

While not shown in FIG. 1, the controller 170 may include a DEMUX and a video processor, which will be described later with reference to FIG. 10.

In addition, the controller 170 may provide overall control to the image display device 100. For example, the controller 170 may control the tuner 110 to tune to an RF broadcast signal corresponding to a user-selected channel or a pre-stored channel.

The controller 170 may control the image display device 100 according to a user command received through the user input interface 150 or according to an internal program. Especially the controller 170 may access a network and download an application or application list selected by the user to the image display device 100 over the network.

For example, the controller 170 controls the tuner 110 to receive a signal of a channel selected according to a specific channel selection command received through the user input interface 150 and processes a video, audio and/or data signal of the selected channel. The controller 170 outputs the processed video or audio signal along with information about the user-selected channel to the display 180 or the audio output unit 185.

As another example, the controller 170 outputs a video or audio signal received from an external device such as a camera or a camcorder through the external device interface 135 to the display 180 or the audio output unit 185 according to an external device video playback command received through the external device interface 150.

The controller 170 may control the display 180 to display images. For instance, the controller 170 may control the display 180 to display a broadcast image received from the tuner 110, an externally input image received through the external device interface 135, an image received through the network interface 130, or an image stored in the memory 140. The image displayed on the display 180 may be a Two-Dimensional (2D) or Three-Dimensional (3D) still image or moving picture.

The controller 170 may control content playback. The content may include any content stored in the image display device 100, received broadcast content, and externally input content. The content includes at least one of a broadcast image, an externally input image, an audio file, a still image, a Web page, or a text file.

Upon receipt of a return-to-home screen input, the controller 170 may control display of the home screen on the display 180.

The home screen may include a plurality of card objects classified according to content sources. The card objects may include at least one of a card object representing a thumbnail list of broadcast channels, a card object representing a broadcast program guide, a card object representing a program reservation list or a program recording list, or a card object representing a media list of a device connected to the image display device. The card objects may further include at least one of a card object representing a list of connected external devices or a card object representing a call-associated list.

The home screen may further include an application menu including at least one application that can be executed.

Upon receipt of a card object move input, the controller 170 may control movement of a card object corresponding to the card object move input on the display 180, or if the card object is not displayed on the display 180, the controller 170 may control display of the card object on the display 180.

When a card object is selected from among the card objects on the home screen, the controller 170 may control display of an image corresponding to the selected card object on the display 180.

The controller 170 may control display of an input broadcast image and an object representing information about the broadcast image in a card object representing broadcast images. The size of the broadcast image may be set to a fixed size.

The controller 170 may control display of a set-up object for at least one of image setting, audio setting, screen setting, reservation setting, setting of a pointer of the remote controller, or network setting on the home screen.

The controller 170 may control display of a log-in object, a help object, or an exit object on a part of the home screen.

The controller 170 may control display of an object representing the total number of available card objects or the number of card objects displayed on the display 180 among all card objects, on a part of the home screen.

If one of the card objects displayed on the display 180 is selected, the controller 170 may full screen the selected card object to cover the entirety of the display 180.

Upon receipt of an incoming call at a connected external device or the image display device 100, the controller 170 may control focusing-on or shift of a call-related card object among the plurality of card objects.

If an application view menu item is selected, the controller 170 may control display of applications or a list of applications that are present in the image display device 100 or downloadable from an external network.

The controller 170 may control installation and execution of an application downloaded from the external network along with various UIs. Also, the controller 170 may control display of an image related to the executed application on the display 180, upon user selection.

Although not shown, the image display device 100 may further include a channel browsing processor for generating thumbnail images corresponding to channel signals or externally input signals.

The channel browsing processor may receive the TS output from the demodulator 120 or the TS output from the external device interface 135, extract images of the received TS and generate thumbnail images. The thumbnail images may be directly output to the controller 170 or may be output after being encoded. Also, it is possible to encode the thumbnail images into a stream and output the stream to the controller 170. The controller 170 may display a thumbnail list including a plurality of received thumbnail images on the display 180. The thumbnail images may be updated sequentially or simultaneously in the thumbnail list. Therefore, the user can readily identify the content of broadcast programs received through a plurality of channels.

The display 180 may convert a processed video signal, a processed data signal, and an OSD signal received from the controller 170 or a video signal and a data signal received from the external device interface 135 into RGB signals, thereby generating driving signals.

The display 180 may be various types of displays such as a Plasma Display Panel (PDP), a Liquid Crystal Display (LCD), an Organic Light-Emitting Diode (OLED) display, a flexible display, and a 3D display.

The display 180 may also be a touchscreen that can be used not only as an output device but also as an input device.

The audio output unit 185 may receive a processed audio signal (e.g., a stereo signal, a 3.1-channel signal or a 5.1-channel signal) from the controller 170 and output the received audio signal as sound. The audio output unit 185 may employ various speaker configurations.

To sense a user gesture, the image display device 100 may further include the sensor unit (not shown) that has at least one of a touch sensor, a voice sensor, a position sensor, and a motion sensor, as stated before. A signal sensed by the sensor unit may be output to the controller 170 through the user input interface 150.

The image display device 100 may further include the camera unit (not shown) for capturing images of a user. Image information captured by the camera unit may be input to the controller 170.

The controller 170 may sense a user gesture from an image captured by the camera unit or a signal sensed by the sensor unit, or by combining the captured image and the sensed signal.

The power supply 190 supplies power to the image display device 100.

Particularly, the power supply 190 may supply power to the controller 170 which may be implemented as a System On Chip (SOC), the display 180 for displaying an image, and the audio output unit 185 for audio output.

For supplying power, the power supply 190 may include a converter (not shown) for converting Alternating Current (AC) into Direct Current (DC). If the display 180 is configured with, for example, a liquid crystal panel having a plurality of backlight lamps, the power supply 190 may further include an inverter (not shown) capable of performing Pulse Width Modulation (PWM) for luminance change or dimming driving.

The remote controller 200 transmits a user input to the user input interface 150. For transmission of user input, the remote controller 200 may use various communication techniques such as Bluetooth, RF communication, IR communication, Ultra Wideband (UWB) and ZigBee.

In addition, the remote controller 200 may receive a video signal, an audio signal or a data signal from the user input interface 150 and output the received signals visually, audibly or as vibrations.

The above-described image display device 100 may be a fixed digital broadcast receiver capable of receiving at least one of ATSC (8-VSB) broadcast programs, DVB-T (COFDM) broadcast programs, and ISDB-T (BST-OFDM) broadcast programs.

The block diagram of the image display device 100 illustrated in FIG. 1 is purely exemplary. Depending upon the specifications of the image display device 100 in actual implementation, the components of the image display device 100 may be combined or omitted or new components may be added. That is, two or more components may be incorporated into one component or one component may be configured as separate components, as needed. In addition, the function of each block is described for the purpose of describing the aspect of this disclosure and thus specific operations or devices should not be construed as limiting the scope and spirit of this disclosure.

Unlike the configuration illustrated in FIG. 1, the image display device 100 may be configured so as to receive and play back video content through the network interface 130 or the external device interface 135, without the tuner 110 and the demodulator 120 shown in FIG. 1.

In some implementations, the image display device 100 may further include an ambient light sensor an illumination sensor (not shown) to sense an ambient light brightness.

Figure 2:
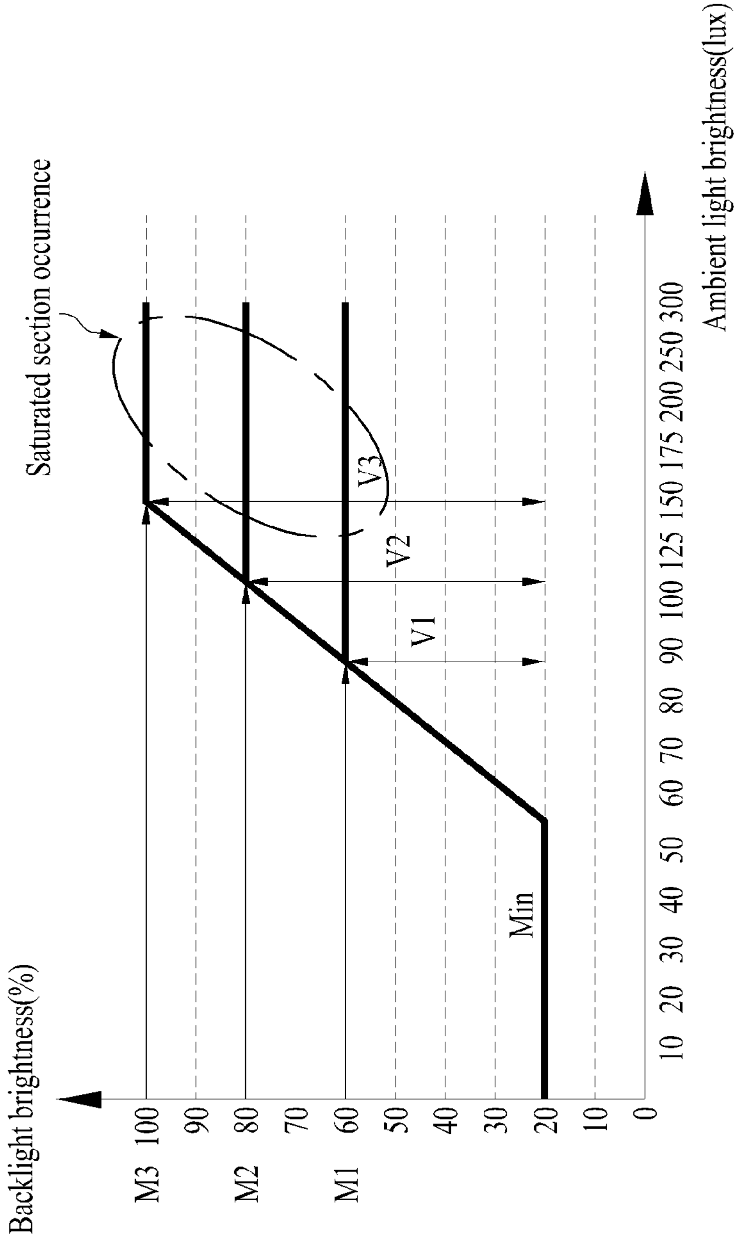
FIG. 2 is a graph illustrating a backlight brightness over an ambient light brightness according to a related art.

Hereinafter, a method of adjusting a display or backlight brightness in the image display device 100 according to a change of an ambient light brightness according to a related art will be further described in detail. FIG. 2 is a graph illustrating a backlight brightness over an ambient light brightness according to a related art.

Hereinafter, the image display device 100 is assumed as including a backlight, and will be described with the concept of "backlight brightness". Yet, the image display device 100 may be configured without a separate backlight, for example, when the image display device 100 includes an OLED display. In this case, it is noted in advance that the following description can be understood by replacing the concept of "backlight brightness" with the concept of "display brightness".

The image display device 100 may be configured to adjust a backlight brightness according to the graph of the backlight brightness graph over the ambient light brightness shown in FIG. 2.

According to the graph, a maximum allowable brightness of a backlight may be selected by a user so as to be one of a plurality of preset values. In FIG. 2, a plurality of the preset values are illustrated as M1, M2, and M3. It is illustrated that M1 corresponds to 60% of the maximum brightness of the backlight, M2 corresponds to 80% of the maximum brightness of the backlight, and M3 corresponds to 100% of the maximum brightness of the backlight.

When a user selects M1, a variable range of the backlight brightness according to an ambient light brightness change may become V1. When the user selects M2, a variable range of the backlight brightness according to an ambient light brightness change may become V2. When the user selects M3, a variable range of the backlight brightness according to an ambient light brightness change may become V3.

That is, when the user selects M1, the brightness of the backlight may be saturated with M1, no matter how bright the ambient light brightness becomes. When the user selects M2, the brightness of the backlight may be saturated with M2, no matter how bright the ambient light brightness becomes. When the user selects M3, the brightness of the backlight may be saturated with M3, no matter how bright the ambient light brightness becomes. This may mean that a saturated section occurs as indicated by a dotted line in FIG. 2.

That is, in the saturated section, it is disadvantageous in that the change in the ambient light brightness cannot be reflected in the display brightness of the image display device.

In FIG. 2, when a user selects M1, an ambient light brightness at which a brightness of a backlight starts to be saturated with M1 is illustrated as about 90 lux. When a user selects M2, an ambient light brightness at which a brightness of a backlight starts to be saturated with M2 is illustrated as about 115 lux. When a user selects M3, an ambient light brightness at which a brightness of a backlight starts to be saturated with M3 is illustrated as about 160 lux.

Meanwhile, if a slope of a line in the graph is arbitrarily gentle to reduce the saturated section, when an ambient light brightness changes in a range of 80 to 150 lux that is an average ambient light brightness at home, a corresponding backlight brightness change becomes small, it is disadvantageous in that the change of the ambient light brightness is not appropriately reflected in a display brightness of the image display device.

Figure 3:
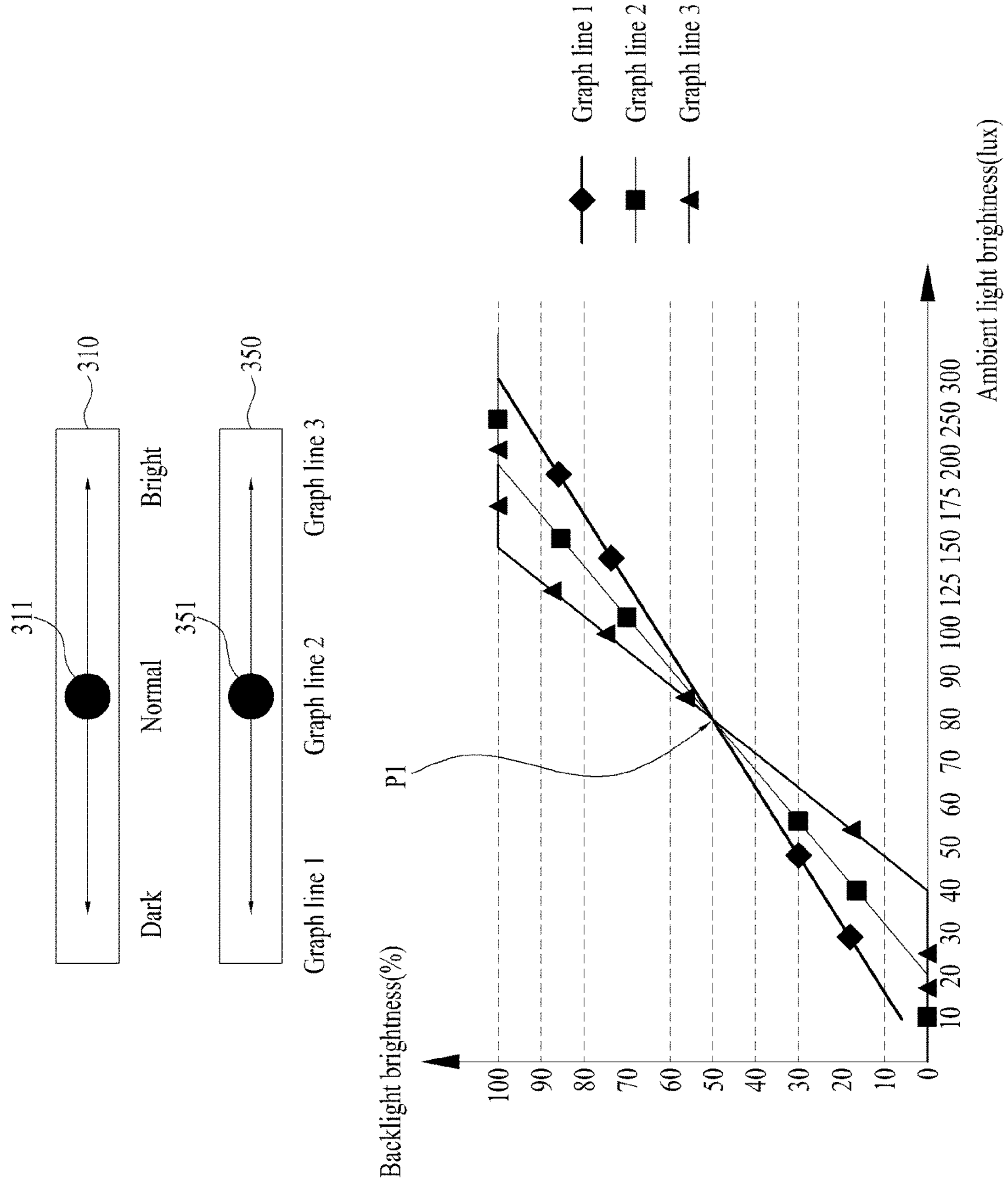
FIG. 3 is a graph illustrating a backlight brightness over an ambient light brightness according to one embodiment of the present disclosure.

Hereinafter, a graph of a backlight brightness over an ambient light brightness of the image display device 100 according to an embodiment of the present disclosure will be described with reference to FIG. 3 and FIG. 4. FIG. 3 is a graph illustrating a backlight brightness over an ambient light brightness according to one embodiment of the present disclosure, and FIG. 4 is a table digitalizing the graph of FIG. 3.

A graph showing a backlight brightness over an ambient light brightness, as shown in FIG. 3, may be prepared in advance in the image display device 100. The graph may be stored in the memory 140. It is illustrated that there are three graph lines in the graph, that is, a graph line 1, a graph line 2, and a graph line 3. These three graph lines may have a form of intersecting at a position P1 to form an intersecting point.

The number of these graph lines and the shape of each graph line are merely illustrative, and there may be more or less graph lines, or there may be different shapes (e.g., curves) of graph lines.

The graph may be displayed on the display 180 according to a user's menu manipulation when the image display device 100 enters a display setting menu.

When the graph is displayed on the display 180, a first user interface 310 for changing the shapes of graph lines in the graph and a second user interface 350 for selecting one of a plurality of the graph lines may be displayed together. The first user interface 310 and the second user interface 350 are illustrated in the form of slide bars such as a first slide bar 310 and a second slide bar 350, respectively. However, it is a matter of the fact that they may be configured in different forms. The first user interface 310 and the second user interface 350 may be displayed together in one screen or may be displayed separately on different screens, respectively.

The graph may be digitized like the table of FIG. 4. The table shows that when an ambient light is about 80 lux, a graph line 1, a graph line 2, and a graph line 3 intersect each other to form an intersecting point, and thus have a backlight brightness of about 50%. In addition, the table shows that each of the graph line 1, the graph line 2, and the graph line 3 starts saturation at a different ambient light brightness. Specifically, the graph line 1 shows that saturation starts when the ambient light brightness is about 300 lux, the graph line 2 shows that saturation starts when the ambient light brightness is about 200 lux, and the graph line 3 shows that saturation starts when the ambient light brightness is about 150 lux.

Accordingly, the graph line 1 may be selected in a place where the average ambient light brightness is bright, the graph line 2 may be selected in a place where the average ambient light brightness is normal, and the graph line 3 may be selected in a place where the average ambient light is dark. Here, bright and dark places may be relative to each other, not an absolute concept.

The image display device 100 may determine a backlight brightness according to the selected graph line and a brightness of an ambient light sensed through an ambient light sensor.

Figure 5:
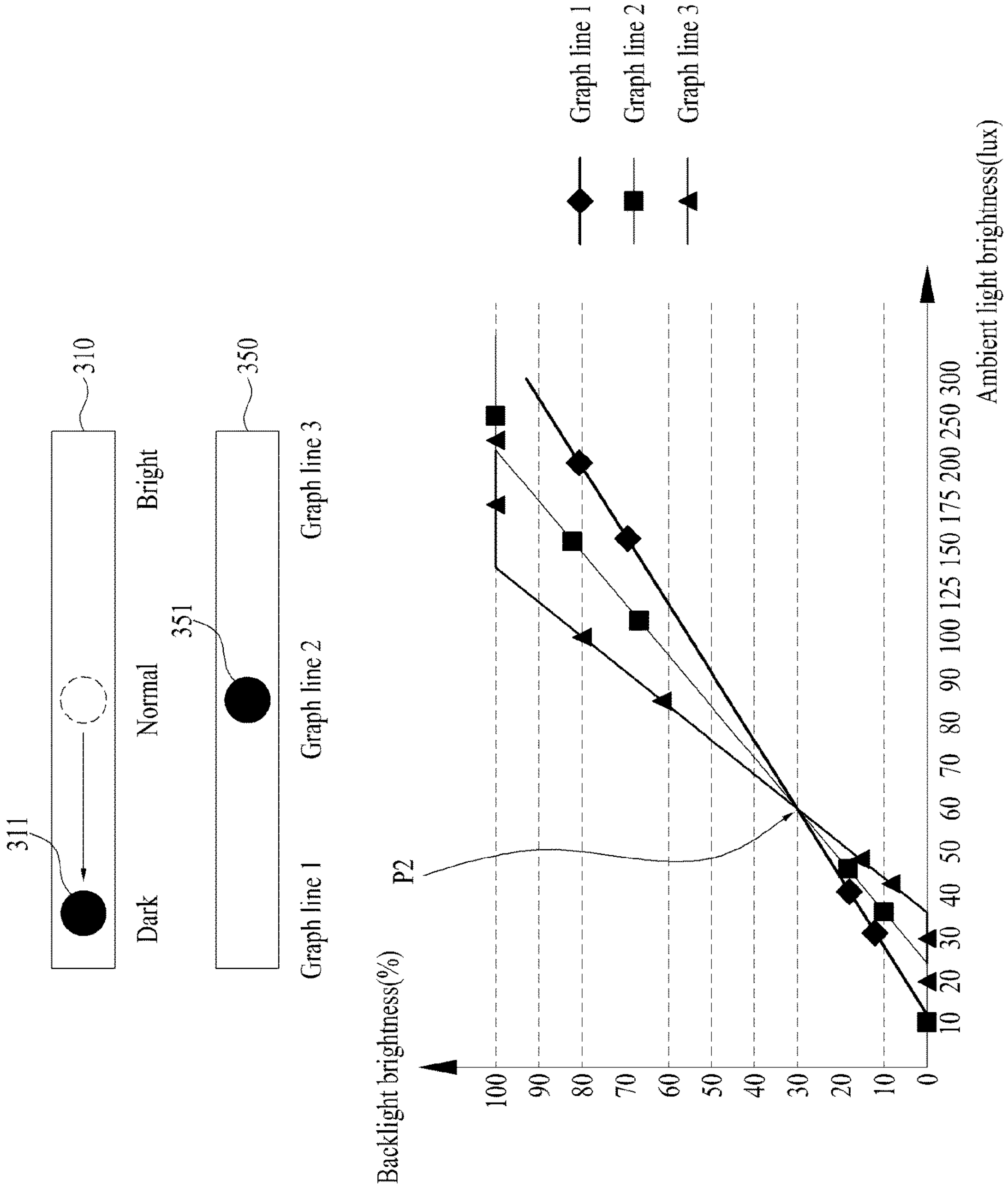
FIG. 5 and FIG. 6 illustrate that the shape of the graph of FIG. 3 is changed.
Figure 6:
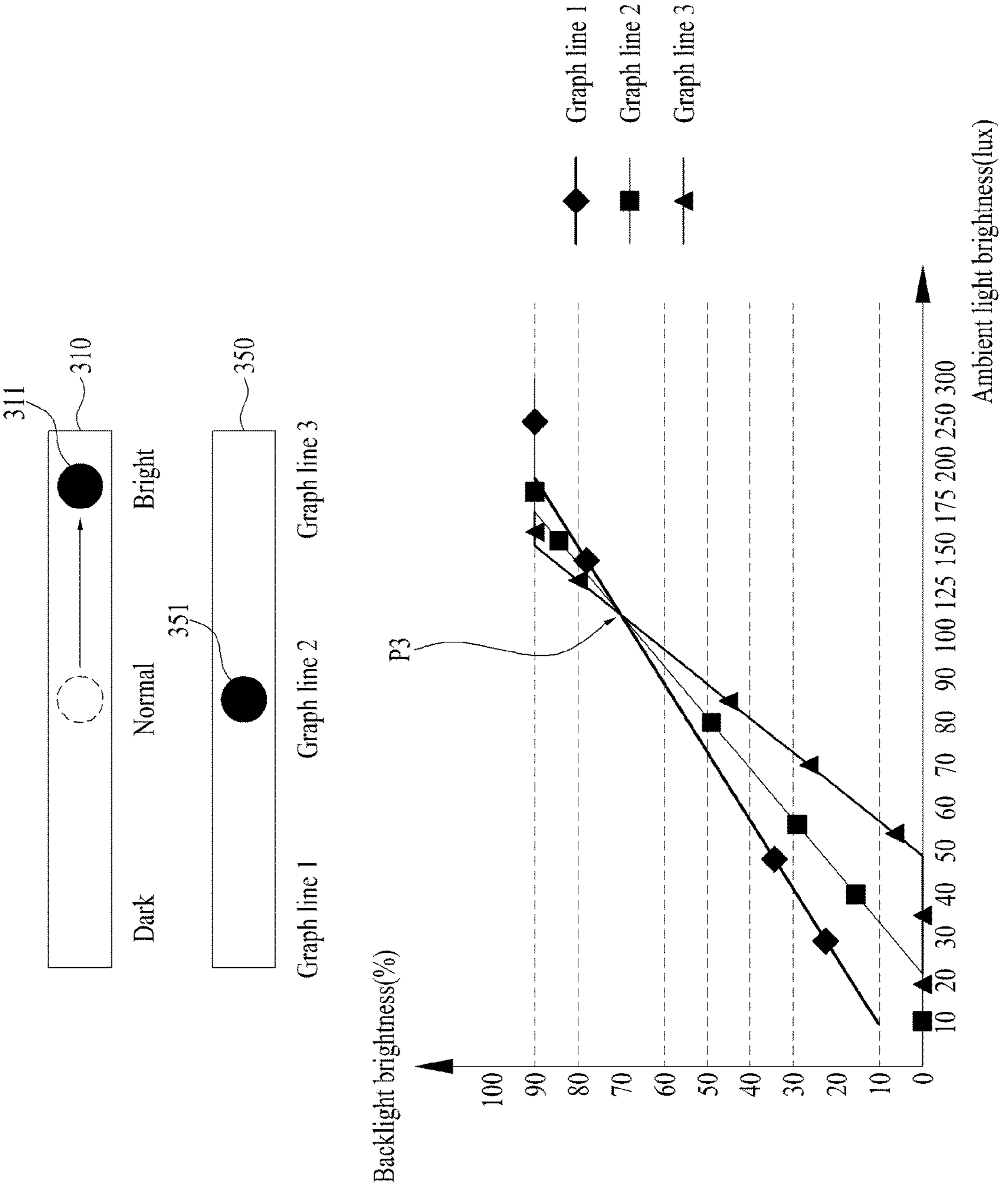

Hereinafter, how the shapes of the graph lines in the graph are changed through the manipulation of the first slide bar 310 will be described with reference to FIG. 5 and FIG. 6. FIG. 5 and FIG. 6 illustrate that the shape of the graph of FIG. 3 is changed.

As illustrated in FIG. 5, an indicator 311 (hereinafter, "slide indicator") of a first slide bar 310 may be moved from "normal" to "dark". The movement of the slide indicator may be performed according to a user command through the remote controller 200.

The movement of the slide indicator is to move an intersecting point of the graph lines in the graph. That is, the intersecting point may be moved in a direction in which an ambient light brightness is dark.

More specifically, as the slide indicator 311 moves from "normal" to "dark", the shapes of the graph lines may be changed such that an intersecting point of the graph lines in the graph moves from a position P1 to a position P2. FIG. 3 illustrates that the intersecting point is formed at a position where an ambient light brightness is about 80 lux, but FIG. 5 illustrates that the intersecting point is formed at a position where the ambient light brightness is about 60 lux.

Comparing the shape-changed graph lines with the graph lines of FIG. 3, FIG. 5 illustrates that in the case of the graph line 1, it is changed not to be saturated even if the ambient light brightness is 300 lux, and in the case of the graph line 3, it is changed to start saturation before the ambient light brightness is 150 lux.

Meanwhile, as illustrated in FIG. 6, the slide indicator 311 may be moved from "normal" to "bright" in the first slide bar 310. As described above, the movement of the slide indicator may be performed according to a user command through the remote control device 200.

Owing to the movement of the slide indicator, the intersecting point may move in a direction in which an ambient light brightness is bright.

More specifically, as the slide indicator 311 moves from "normal" to "bright", the shapes of the graph lines may be changed such that an intersecting point of the graph lines in the graph moves from the position P1 to the position P3. In FIG. 3, the intersecting point is formed at a position where the ambient light brightness is about 80 lux, but in FIG. 6, the intersecting is formed at a position where the ambient light brightness is about 100 to 125 lux.

Comparing the shape-changed graph lines with the graph lines of FIG. 3, FIG. 6 illustrates that in the case of the graph line 1, it is changed to start saturation before the ambient light brightness is 300 lux, and in the case of the graph line 3, it is changed to start saturation before the ambient light brightness is 150 lux.

Although FIG. 5 and FIG. 6 illustrate the shapes of the graph lines are changed in a manner of moving the intersecting point of the graph lines, it is a matter of course that the shapes of the graph lines may be changed in another manner (e.g., individual adjustment of the slope of each graph line).

Figure 7:
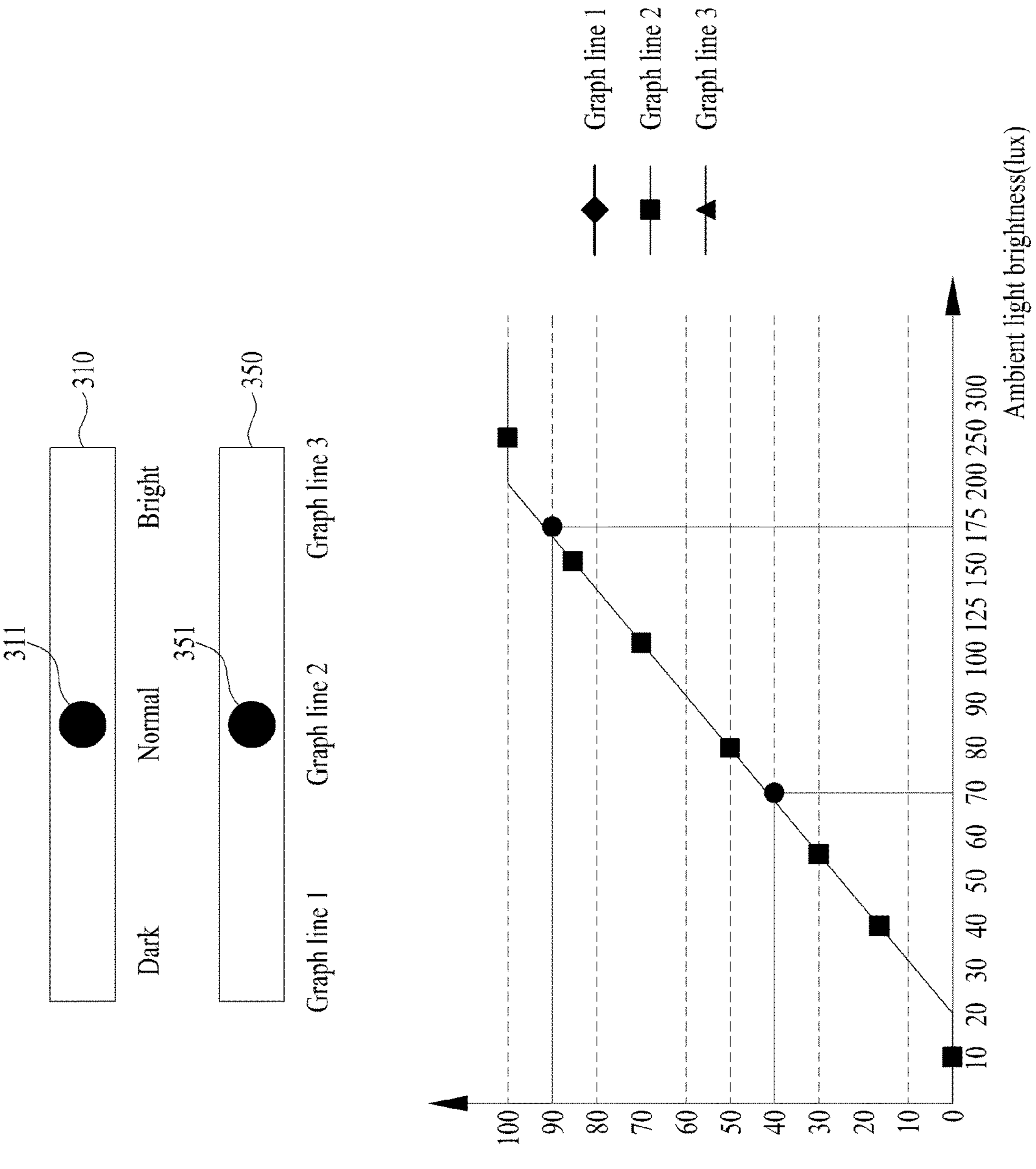
FIGS. 7 to 9 illustrate that a single graph line is selected from the graph of FIG. 3.
Figure 8:
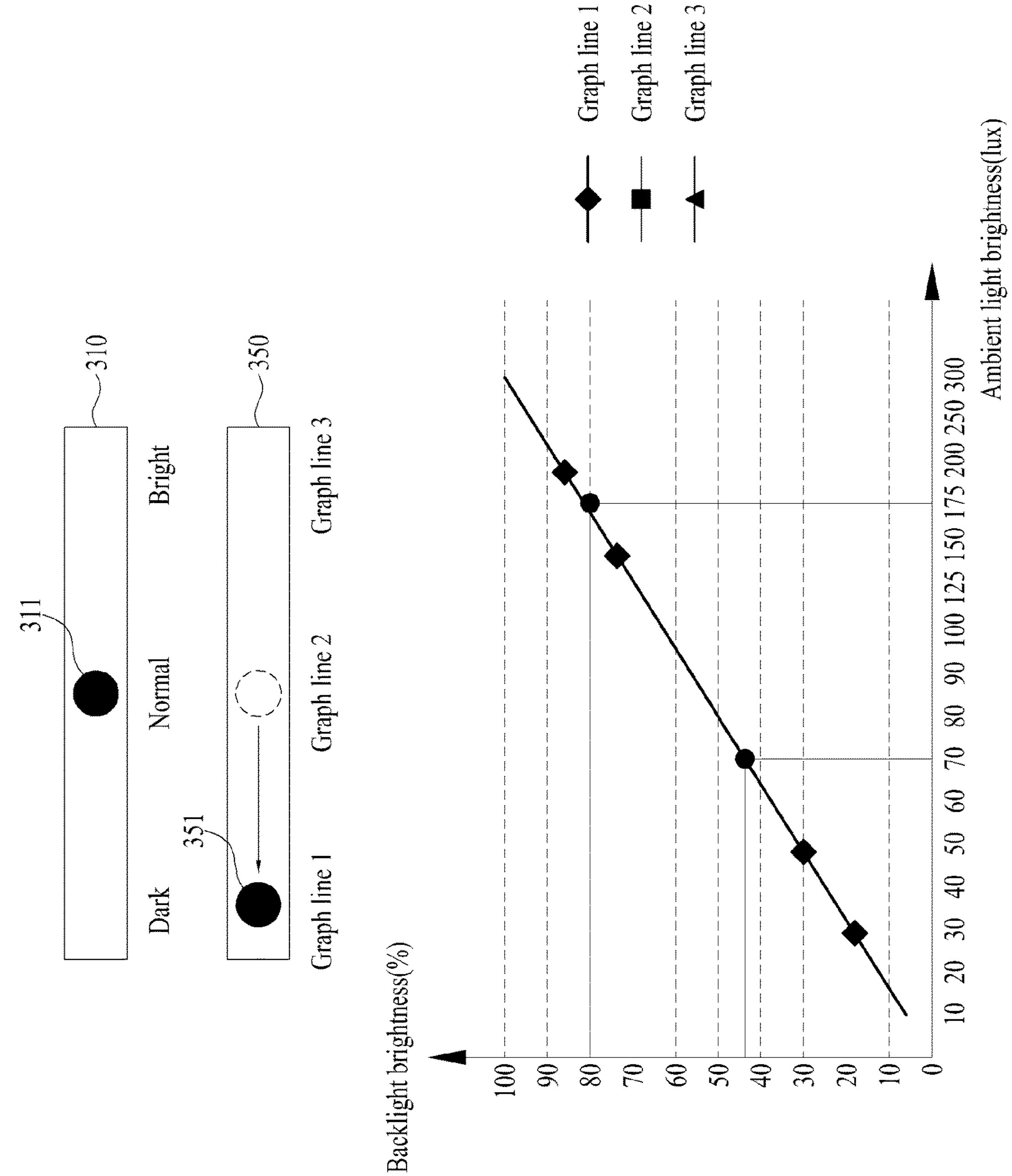
Figure 9:
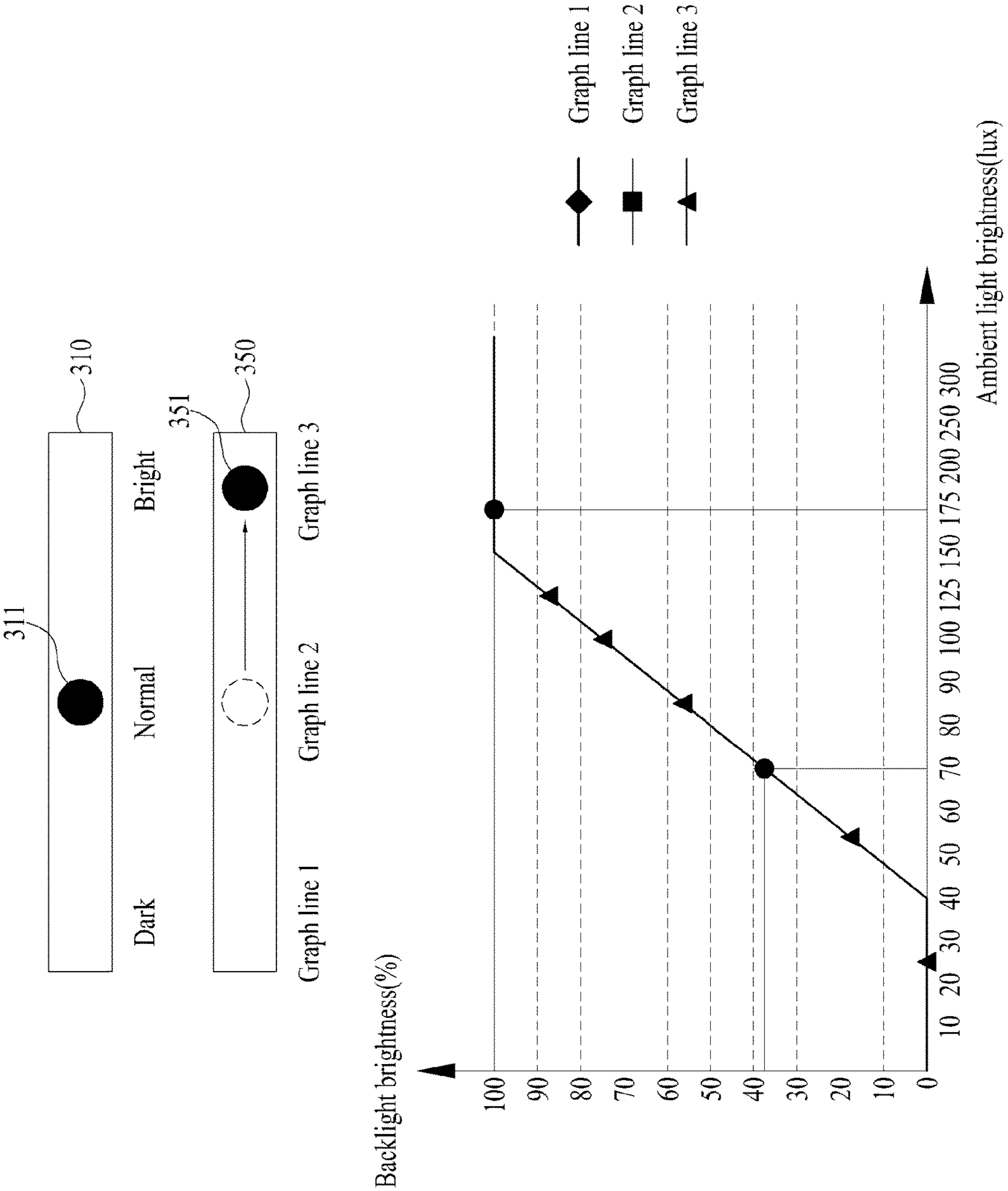

Hereinafter, with reference to FIGS. 7 to 9, selecting one graph line according to a user command from a plurality of the graph lines will be described. FIGS. 7 to 9 illustrate that a single graph line is selected from the graph of FIG. 3;

Hereinafter, for convenience of description, it will be described that one graph line is selected from a plurality of graph lines with reference to the graph according to FIG. 3 among FIGS. 3, 5, and 6. It will be obvious that this description may be exactly applied to another graph, i.e., the graph of FIG. 5 or FIG. 6.

FIG. 7 illustrates that a graph line 2 is selected by positioning an indicator 351 (hereinafter, "graph line indicator") of a second slide bar 350 such that the graph line 2 is selected from a plurality of graph lines (graph line 1, graph line 2, and graph 3) of FIG. 3. In FIG. 7, in order to emphasize that the graph line 2 is selected, the views of the graph lines 1 and 2 are omitted.

Accordingly, the image display device 100 may determine a backlight brightness according to the graph line 2 and a brightness of ambient light sensed through the ambient light sensor.

FIG. 7 illustrates that the backlight brightness is about 40% when the ambient light brightness is about 70 lux, and that the backlight brightness is about 90% when the ambient light brightness is about 175 lux.

As shown in FIG. 8 and FIG. 9, another graph line may be selected from the graph lines of FIG. 3 through the manipulation of the second slide bar 350.

Specifically, as shown in FIG. 8, as the graph line indicator 351 is moved from the graph line 2 to the graph line 1, the graph line 1 may be selected instead of the graph line 2. In FIG. 8, in order to emphasize that the graph line 1 is selected, the views of the graph lines 2 and 3 are omitted.

Accordingly, the image display device 100 may determine a backlight brightness according to the graph line 1 and a brightness of ambient light sensed through the ambient light sensor.

FIG. 8 illustrates that the backlight brightness is about 45% when the ambient light brightness is about 70 lux, and that the backlight brightness is about 80% when the ambient light brightness is about 175 lux.

In some implementations, as shown in FIG. 9, as the graph line indicator 351 is moved from the graph line 2 to the graph line 3, the graph line 3 may be selected instead of the graph line 2. In FIG. 9, in order to emphasize that the graph line 3 is selected, the views of the graph lines 1 and 2 are omitted.

Accordingly, the image display device 100 may determine a backlight brightness according to the graph line 3 and a brightness of ambient light sensed through the ambient light sensor.

FIG. 9 illustrates that the backlight brightness is about 35% when the ambient light brightness is about 70 lux, and that the backlight brightness is almost 90% when the ambient light brightness is about 175 lux.

In FIGS. 3, 5, and 6, the graph lines have been described to have shapes so as to have a single intersecting point. However, the present disclosure is non-limited thereto. For example, the graph lines may be shaped to have two intersecting points. This will be described with further reference to FIG. 10. FIG. 10 is a graph illustrating a backlight brightness over an ambient light brightness according to one embodiment of the present disclosure.

Figure 10:
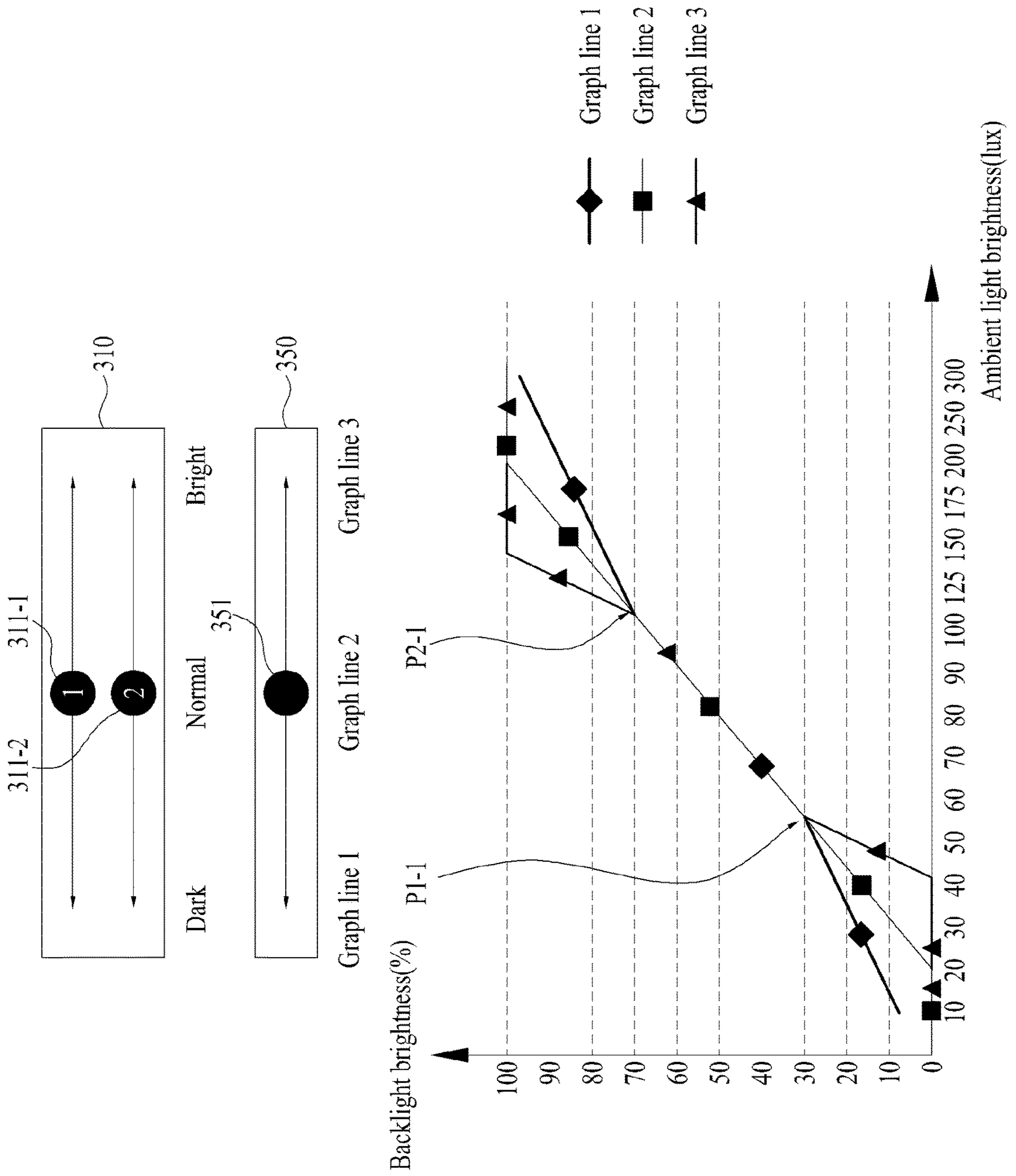
FIG. 10 is a graph illustrating a backlight brightness over an ambient light brightness according to one embodiment of the present disclosure.

A graph showing a backlight brightness over an ambient light brightness, as shown in FIG. 10, may be prepared in advance in the image display device 100. It is illustrated that there are three graph lines in the graph, that is, a graph line 1, a graph line 2, and a graph line 3. These three graph lines may intersect at positions P1-1 and P2-1, respectively, to form two intersecting points, and may overlap as a single graph line between the two intersecting points. Hereinafter, regarding the two intersecting points, an intersecting point crossing at a relatively low ambient light brightness is referred to as a first intersecting point, and an intersecting point crossing at a relatively high ambient light brightness is referred to as a second intersecting point. In FIG. 10, the first intersecting point and the second intersecting point are illustrated as being located at the positions P1-1 and P2-1, respectively. That is, the first intersecting point is formed at a point where the ambient light brightness is about 55 to 60 lux, and the second intersecting point is formed at a point where the ambient light brightness is about 100 to 125 lux. In addition, it is illustrated that the graph line 1 does not saturate when the ambient light brightness is 300 lux, the graph line 2 starts saturation when the ambient light brightness is about 200 lux, and the graph line 3 starts saturation when the ambient light brightness is 150 lux.

The number of these graph lines and the shape of each graph line are only illustrative, and the shape may include a curve even if there are more or less graph lines.

The graph may be displayed on the display 180 according to a user's menu manipulation when the image display device 100 enters a display setting menu.

When the graph is displayed on the display 180, a first user interface 310 for changing the shapes of graph lines in the graph and a second user interface 350 for selecting one of a plurality of the graph lines may be displayed together. The first user interface 310 and the second user interface 350 are illustrated as configured in the form of slide bars such as a first slide bar 310 and a second slide bar 350, respectively. Yet, it is a matter of course that they may be configured in different forms.

Hereinafter, how the shapes of the graph lines in the graph are changed through the manipulation of the first slide bar 310 will be described with reference to FIGS. 11 to 14. FIGS. 11 to 14 illustrate that the shape of the graph of FIG. 10 is changed. FIGS. 11 to 14 illustrate that the shape of the graph of FIG. 10 is changed.

Figure 11:
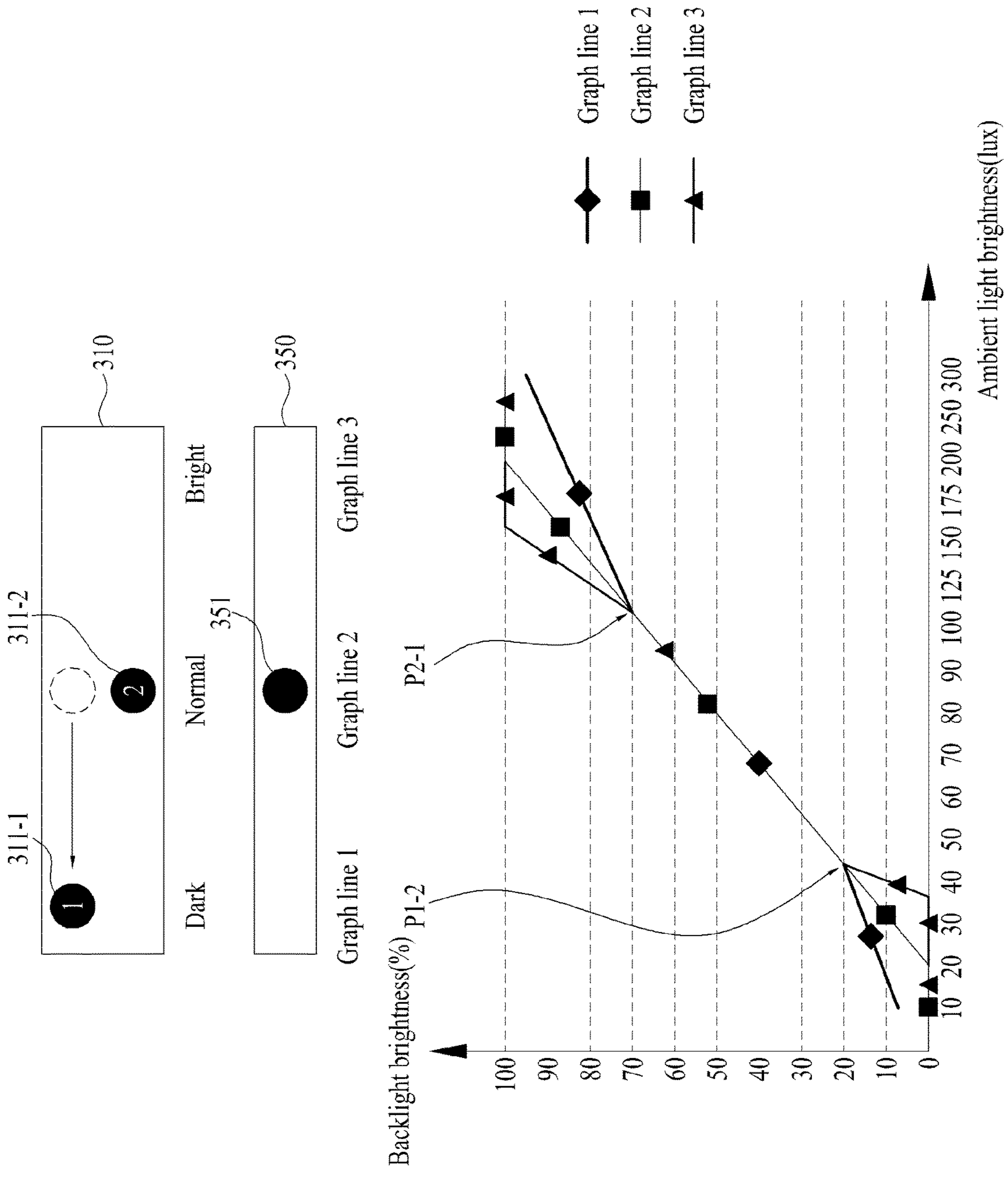
FIGS. 11 to 14 illustrate that the shape of the graph of FIG. 10 is changed.

As shown in FIG. 11, a first indicator 311-1 (hereinafter, "first slide indicator") of the first slide bar 310 may be moved from "normal" to "dark", and a second indicator 311-2 (hereinafter, "second slide indicator") of the first slide bar 310 may remain at "normal" as it is. The movement of the first slide indicator 311-1 may be performed according to a user command through the remote controller 200.

The movement of the first slide indicator 311-1 is to move a first intersecting point of the graph lines in the graph. That is, the first intersecting point may be moved in a direction in which an ambient light brightness is dark.

More specifically, as the first slide indicator 311-1 is moved from "normal" to "dark", the shapes of the graph lines may be changed so that the first intersecting point of the graph lines in the graph may be moved from a position P1-1 to a position P1-2. In FIG. 10, it is illustrated that the first intersecting point is formed at a position where the ambient light brightness is about 55 to 60 lux, but in FIG. 11, it is illustrated that a second intersecting point is formed at a position where the ambient light brightness is about 45 lux.

Figure 12:
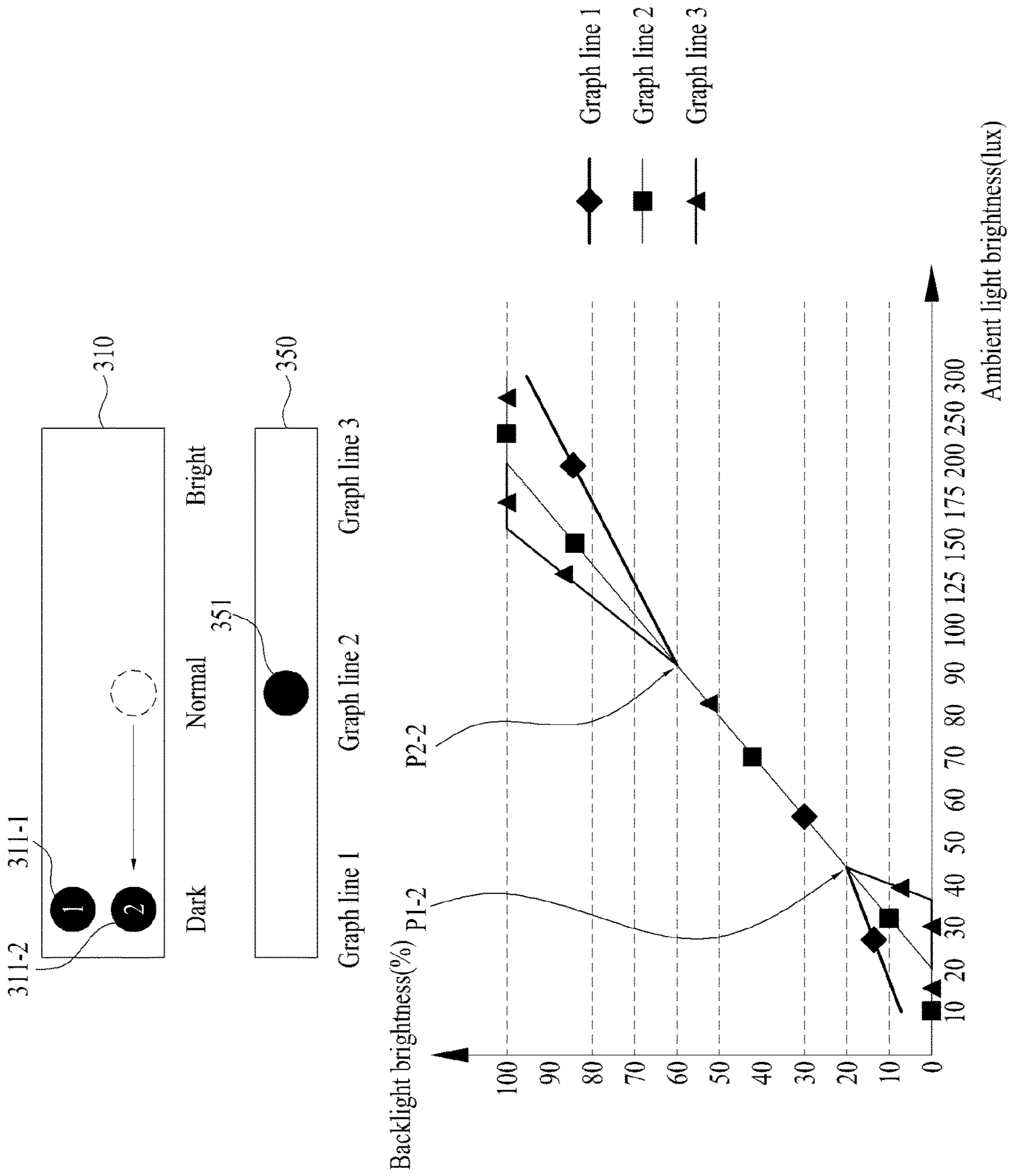

Next, as shown in FIG. 12, while the first slide indicator 311-1 is in the "darkness", the second slide indicator 311-2 may be moved from "normal" to "darkness". The movement of the second slide indicator 311-2 may also be performed according to a user command through the remote controller 200.

The movement of the second slide indicator 311-2 is to move the second intersecting point of the graph lines in the graph. That is, the second intersecting point may be moved in a direction in which the ambient light brightness is dark.

More specifically, as the second slide indicator 311-2 is moved from "normal" to "dark", the shapes of the graph lines may be changed so that the second intersecting point of the graph lines in the graph is moved from a position P2-1 to a position P2-2. In FIG. 10, the second intersecting point is formed at a position where the ambient light brightness is about 125 lux, but in FIG. 12, the second intersecting point is formed at a position where the ambient light brightness is about 90 lux.

Figure 13:
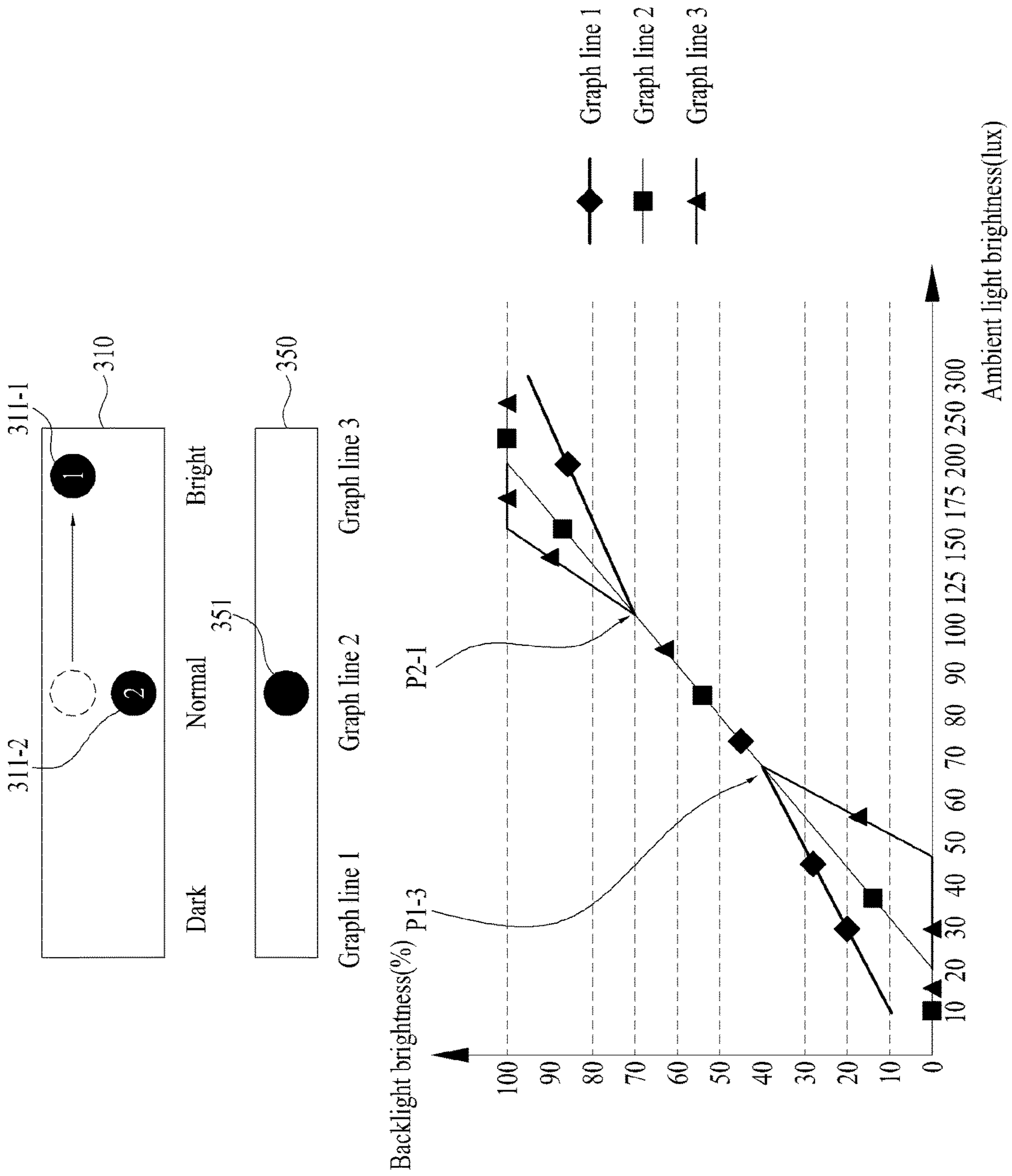

Meanwhile, as shown in FIG. 13, the first slide indicator 311-1 may be moved from "normal" to "bright" while the second slide indicator 311-2 is in "normal". The movement of the first slide indicator 311-1 may be performed according to a user command through the remote controller 200.

The movement of the first slide indicator 311-1 is to move the first intersecting point of the graph lines in the graph, and the second intersecting point may be moved in a direction in which the ambient light brightness is dark.

More specifically, as the first slide indicator 311-1 is moved from "normal" to "bright", the shapes of the graph lines may be changed so that the first intersecting point of the graph lines in the graph is moved from the position P1-1 to a position P1-3. In FIG. 10, the first intersecting point is formed at a position where the ambient light brightness is about 55 to 60 lux, but in FIG. 13, the first intersecting point is illustrated as formed at a position where the ambient light brightness is about 60 to 70 lux.

Figure 14:
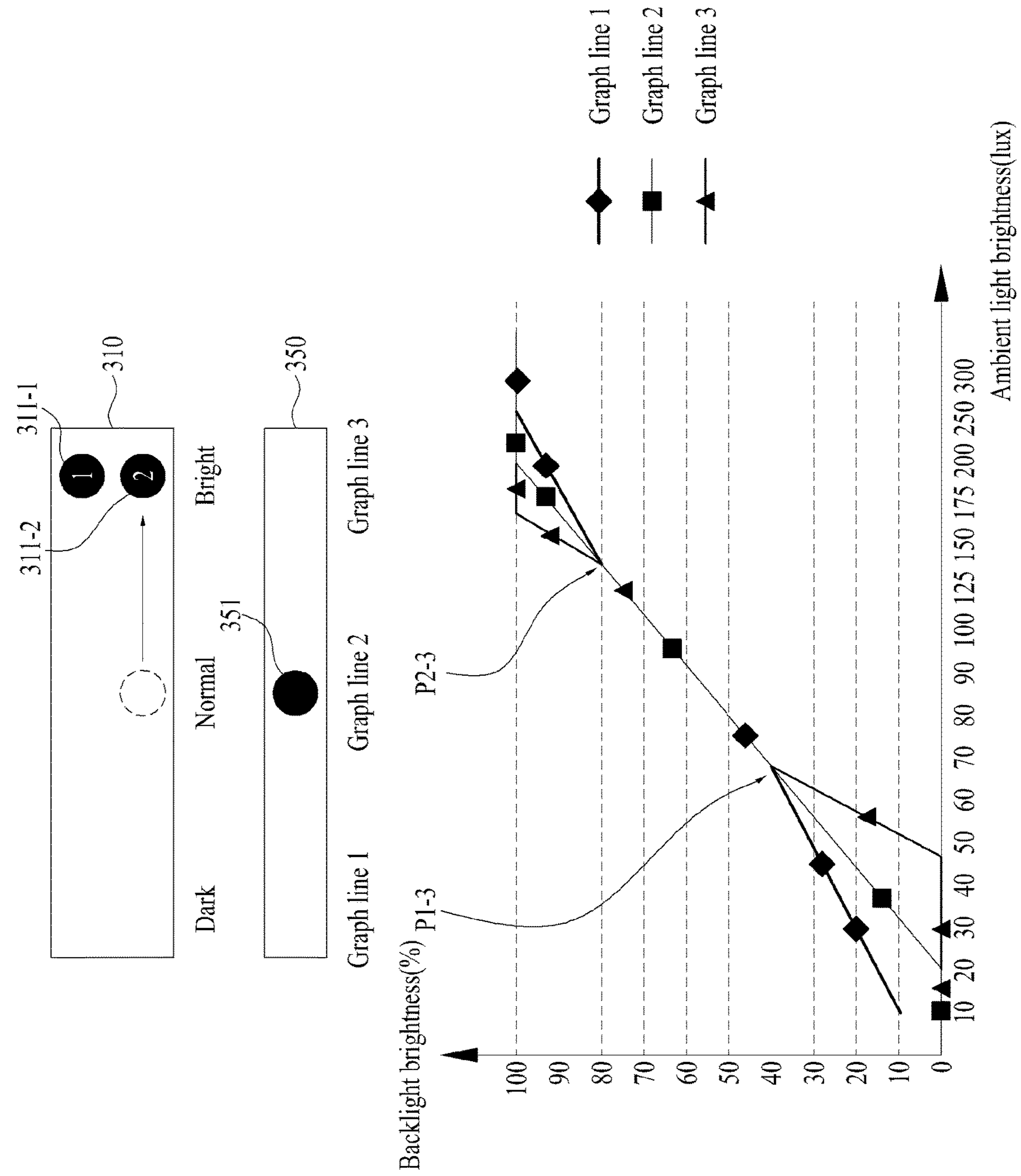

Next, as shown in FIG. 14, while the first slide indicator 311-1 is in the "brightness", the second slide indicator 311-2 may be moved from "normal" to "brightness". The movement of the second slide indicator 311-2 may also be performed according to a user command through the remote controller 200.

The movement of the second slide indicator 311-2 is to move the second intersecting point of the graph lines in the graph. That is, the second intersecting point may be moved in a direction in which ambient light brightness is bright.

More specifically, as the second slide indicator 311-2 is moved from "normal" to "dark", the shapes of the graph lines may be changed so that the second intersecting point of the graph lines in the graph is moved from the position P2-1 to a position P2-3. In FIG. 10, the second intersecting point is formed at a position where the ambient light brightness is about 100 to 125 lux, but in FIG. 13, the second intersecting point is illustrated as formed at a position where the ambient light brightness is about 125 to 150 lux.

Although FIGS. 11 to 14 illustrate the shapes of the graph lines are changed in a manner of moving the first intersecting point and the second intersecting point of the graph lines, it is a matter of course that the shapes of the graph lines may be changed in another manner (e.g., individual adjustment of the slope of each graph line).

Figure 15:
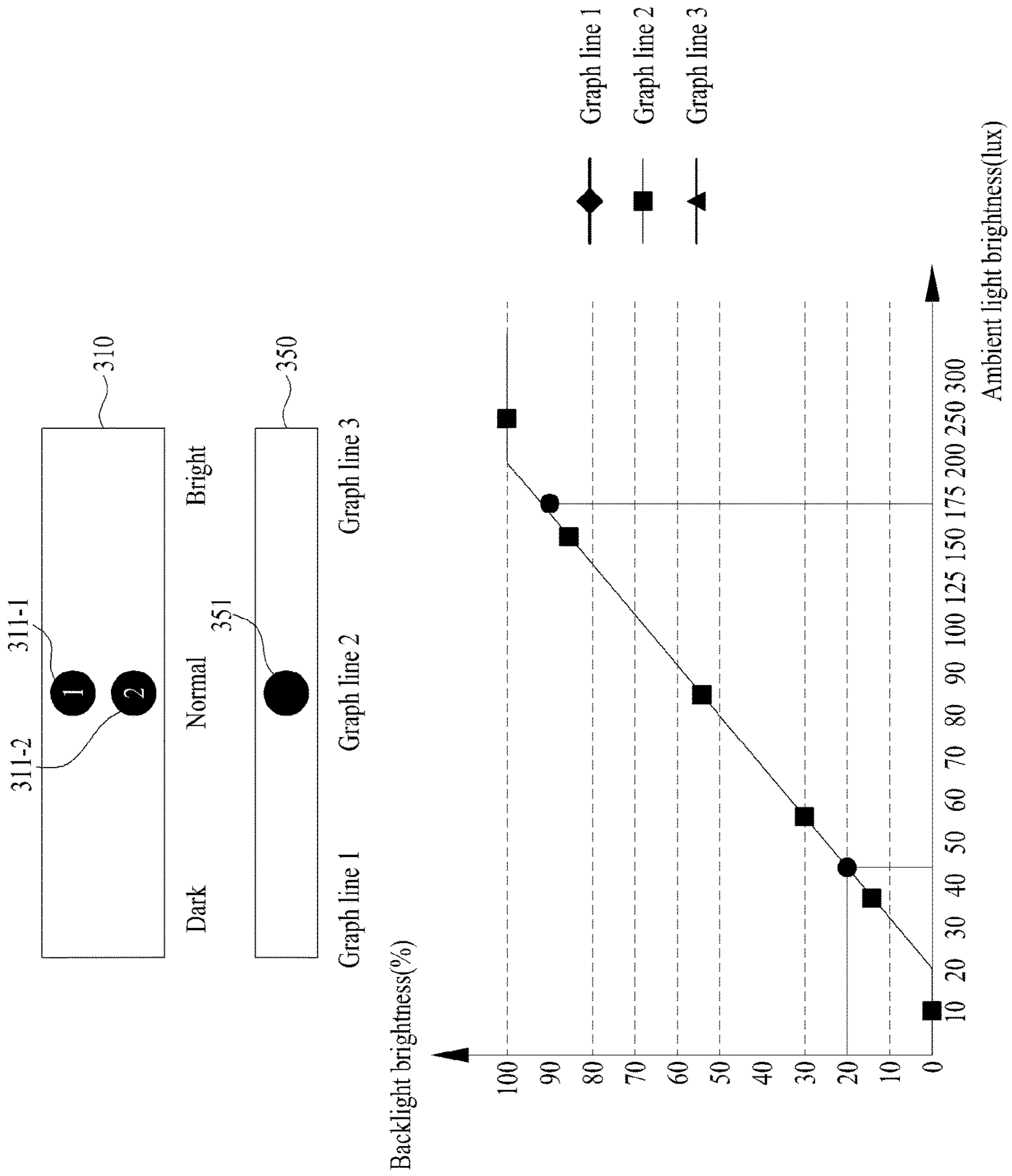
FIGS. 15 to 17 illustrate that a single graph line is selected from the graph of FIG. 3.
Figure 16:
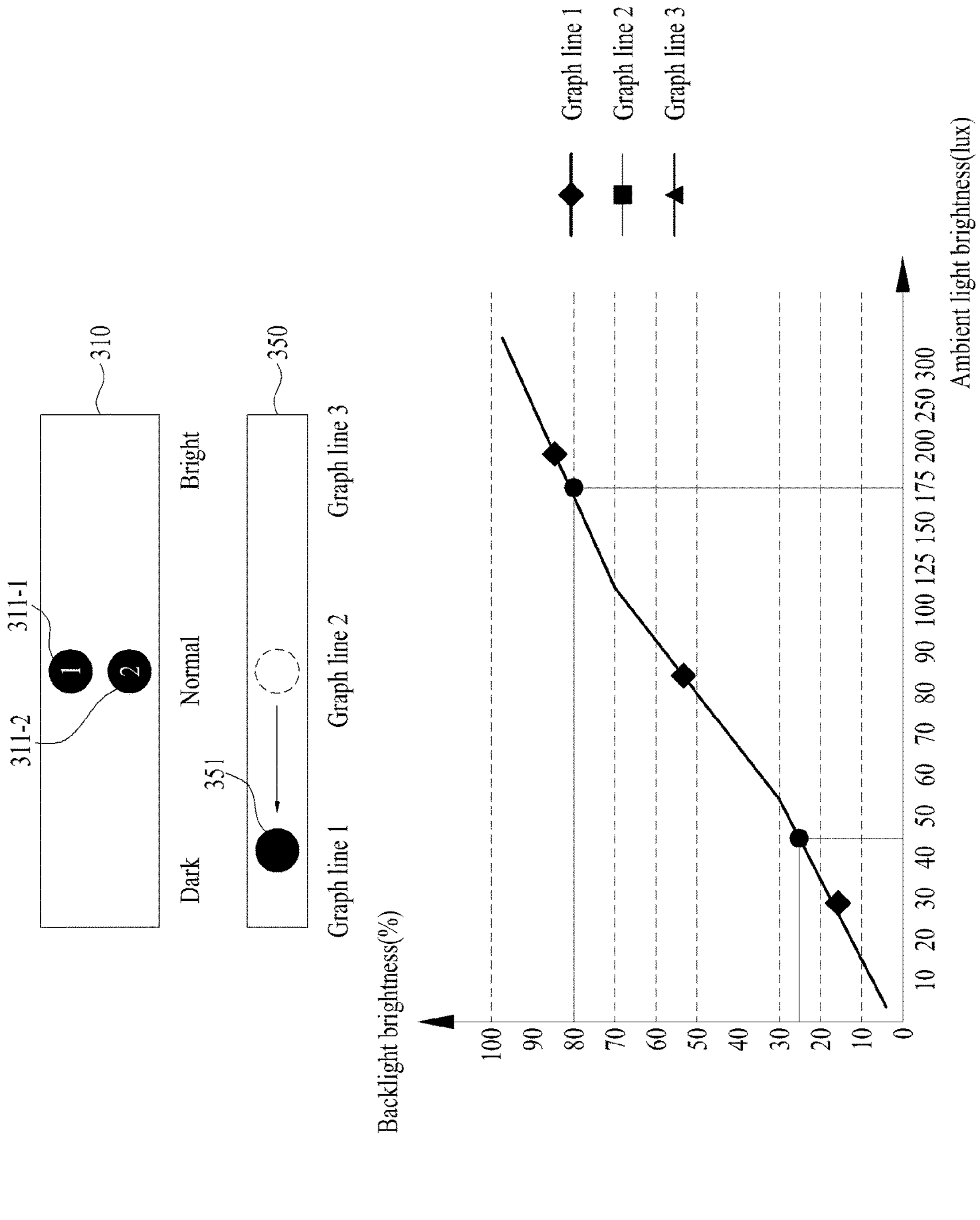
Figure 17:
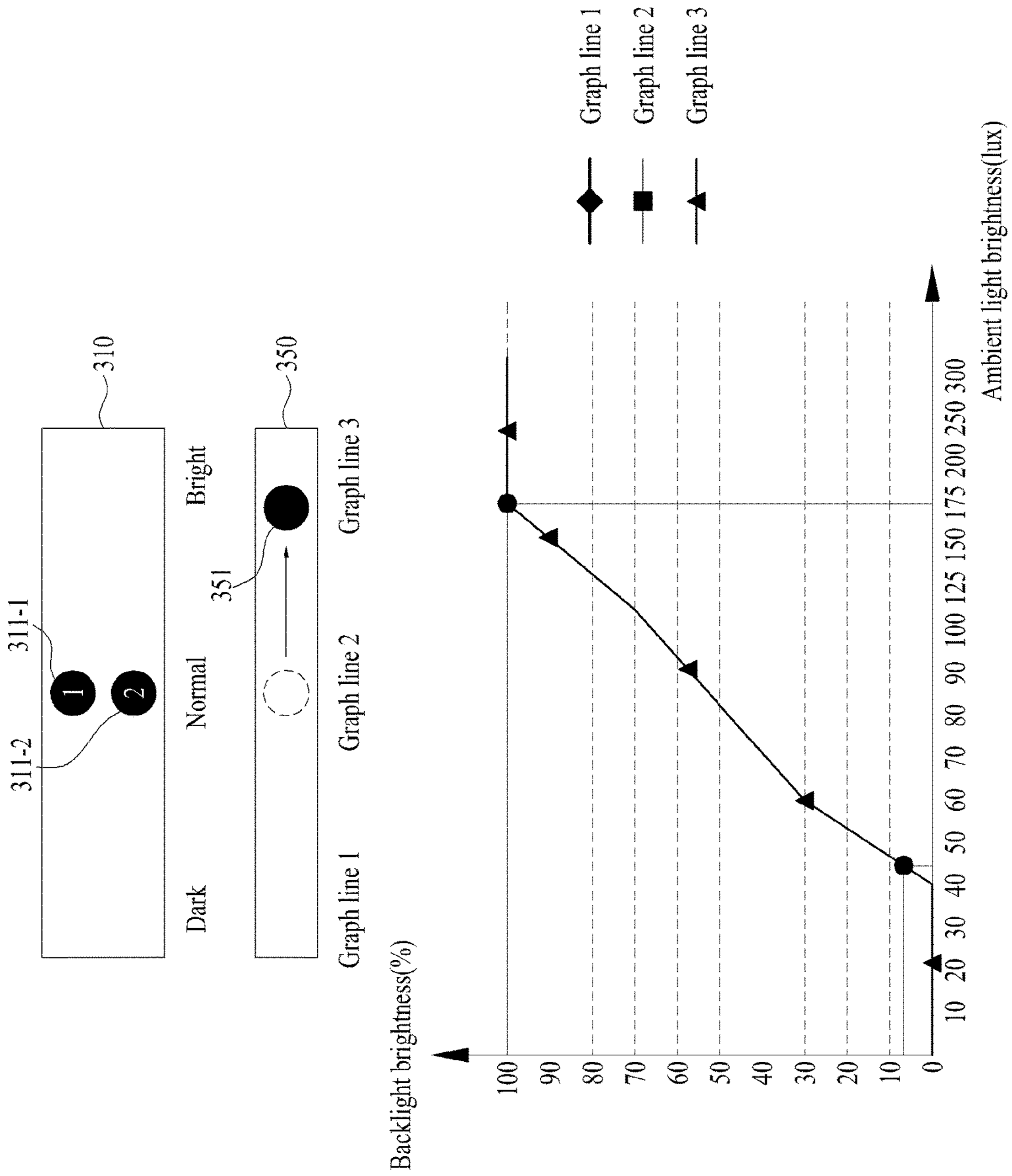

Hereinafter, with reference to FIGS. 15 to 17, selecting one graph line according to a user command from a plurality of the graph lines will be described. FIGS. 15 to 17 illustrate that a single graph line is selected from the graph of FIG. 3;

Hereinafter, for convenience of description, it will be described that one graph line is selected from a plurality of graph lines with reference to the graph according to FIG. 10 among FIGS. 10 to 14. It will be obvious that this description may be exactly applied to other graphs, i.e., the graphs of FIGS. 11 to 14.

FIG. 15 illustrates that a graph line 2 is selected by positioning a graph line indicator 351 of a second slide bar 350 such that the graph line 2 is selected from a plurality of graph lines (graph line 1, graph line 2, and graph 3) of FIG. 10. In FIG. 15, in order to emphasize that the graph line 2 is selected, the views of the graph lines 1 and 2 are omitted.

Accordingly, the image display device 100 may determine a backlight brightness according to the graph line 2 and a brightness of ambient light sensed through the ambient light sensor.

FIG. 15 illustrates that the backlight brightness is about 40% when the ambient light brightness is about 45 lux, and that the backlight brightness is about 90% when the ambient light brightness is about 175 lux.

As shown in FIG. 16 and FIG. 17, another graph line may be selected from the graph lines of FIG. 10 through the manipulation of the second slide bar 350.

Specifically, as shown in FIG. 16, as the graph line indicator 351 is moved from the graph line 2 to the graph line 1, the graph line 1 may be selected instead of the graph line 2. In FIG. 16, in order to emphasize that the graph line 1 is selected, the views of the graph lines 2 and 3 are omitted.

Accordingly, the image display device 100 may determine a backlight brightness according to the graph line 1 and a brightness of ambient light sensed through the ambient light sensor.

FIG. 16 illustrates that the backlight brightness is about 25% when the ambient light brightness is about 45 lux, and that the backlight brightness is about 80% when the ambient light brightness is about 175 lux.

In some implementations, as shown in FIG. 17, as the graph line indicator 351 is moved from the graph line 2 to the graph line 3, the graph line 3 may be selected instead of the graph line 2. In FIG. 17, in order to emphasize that the graph line 3 is selected, the views of the graph lines 1 and 2 are omitted.

Accordingly, the image display device 100 may determine a backlight brightness according to the graph line 3 and a brightness of ambient light sensed through the ambient light sensor.

FIG. 17 illustrates that the backlight brightness is about 5% when the ambient light brightness is about 45 lux, and that the backlight brightness is almost 100% when the ambient light brightness is about 175 lux.

Figure 18:
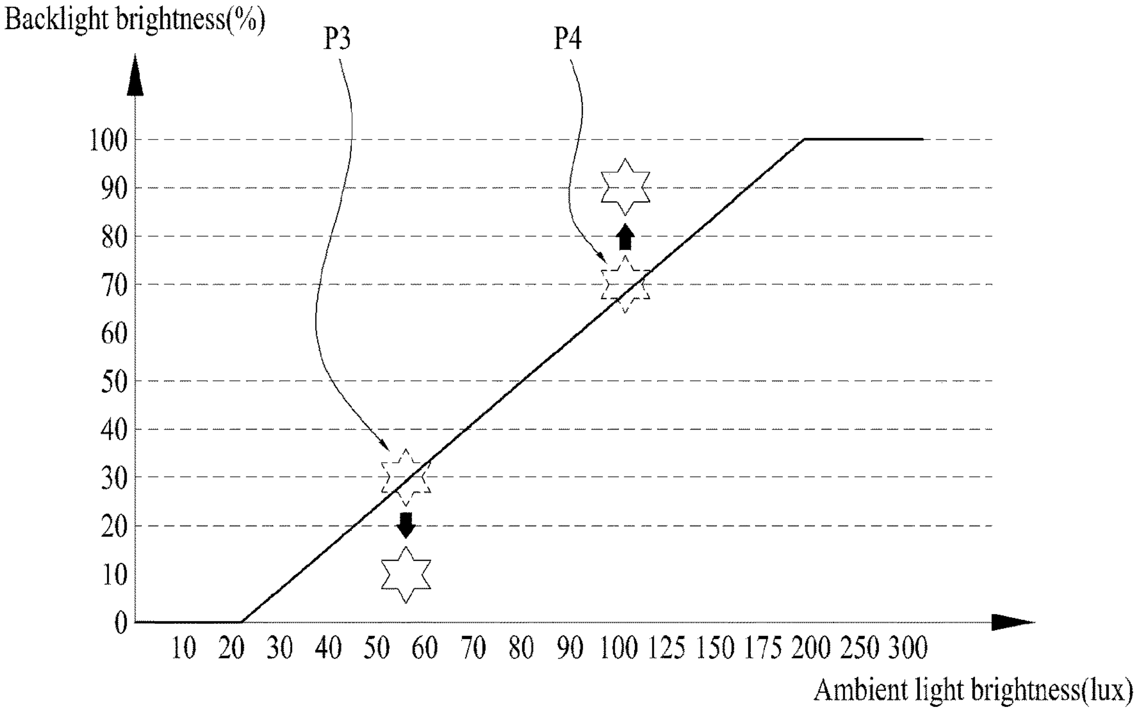
FIG. 18 illustrates that a graph line indicating a backlight brightness over an ambient light brightness is changed according to one embodiment of the present disclosure.
Figure 18:
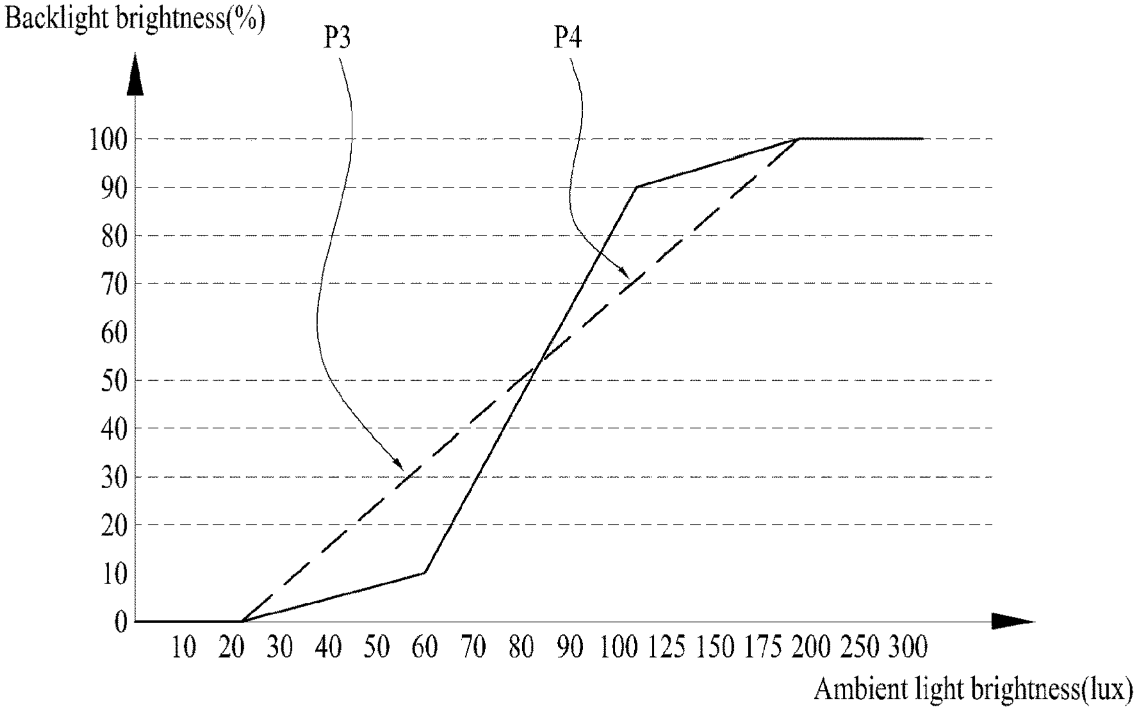

In the above description, changing the shapes of the graph lines by moving the intersecting point of the graph lines through the manipulation of the first slide bar 310 has been described. Yet, the shapes of the graph lines may be changed by other methods without manipulation of the first slide bar 310. For example, when one point of a graph line is selected and dragged by a user, the shape of the graph line may be changed as a portion of the graph line corresponding to the one point is deformed according to the drag direction. This will be described with further reference to FIG. 18. FIG. 18 illustrates that a graph line indicating a backlight brightness over an ambient light brightness is changed according to one embodiment of the present disclosure.

As shown in (18-1) of FIG. 18, when the image display device 100 displays a graph line indicating backlight brightness over an ambient light brightness, at least one point of the graph line may be selected and dragged. FIG. 18 exemplarily illustrates that two points, that is, points P3 and P4, are selected and dragged. Namely, it is illustrated that the point P3 is dragged downward and the point P4 is dragged upward.

When the display 180 of the image display device 100 is configured as a touchscreen, the two points may be directly touched and selected and then dragged.

Alternatively, a pointer (not shown) corresponding to the remote controller 200 may be displayed on the display 180, and the two points may be selected and dragged by moving the pointer while pressing a specific button in the remote controller 200.

Then, as shown in (18-2) of FIG. 18, the graph line may be deformed in the downward direction at the point P3 and the upward direction at the point P4.

FIG. 18 illustrates that one point of the graph line is dragged upward or downward and the shape of the graph line is changed according to the drag direction. Yet, it is a matter of course that, as one point of the graph line is dragged in a left or right direction, the shape of the graph line may be changed according to the drag direction.

Figure 19:
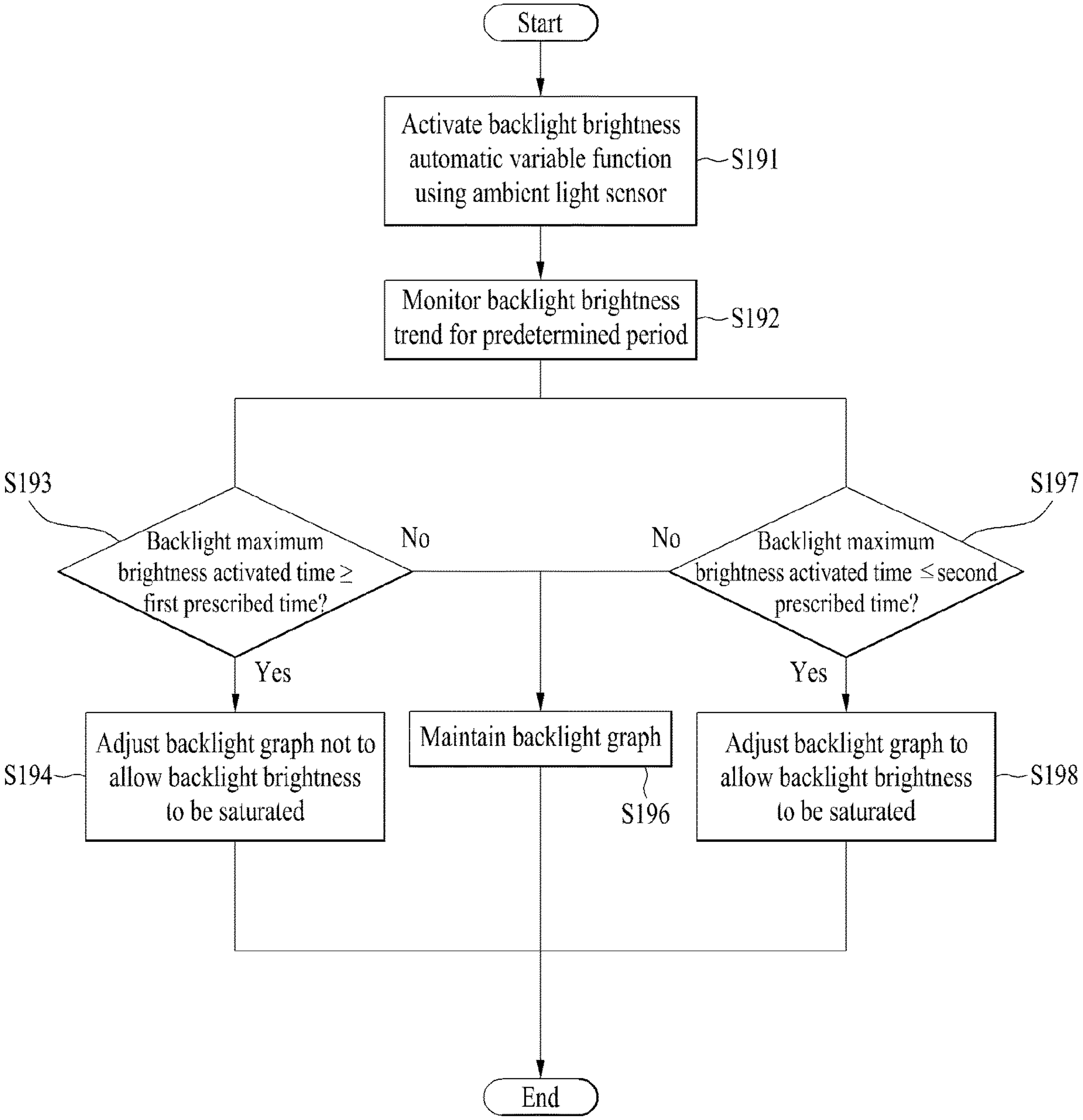
FIG. 19 is a flowchart of selecting a graph line of a backlight brightness over an ambient light brightness according to one embodiment of the present disclosure.

In the above description, one graph line is selected according to a user command from a plurality of graph lines, and a backlight brightness is determined according to the selected graph line and a brightness of ambient light sensed through the ambient light sensor. Yet, one of a plurality of the graph lines does not have to be selected according to a user command, i.e., manually. One graph line among a plurality of the graph lines may be automatically selected. This will be described with further reference to FIG. 19. FIG. 19 is a flowchart of selecting a graph line of a backlight brightness over an ambient light brightness according to one embodiment of the present disclosure.

A backlight brightness automatic variable function using the ambient light sensor of the image display device 100 may be activated [S191]. When the function is activated, the image display device 100 may adjust a brightness of the backlight according to an ambient light brightness sensed in real time by the ambient light sensor based on a pre-configured backlight brightness-to-ambient light graph line.

Thereafter, the controller 170 of the image display device 100 may monitor a trend of the brightness of the backlight from a current time to a past predetermined time (e.g., during the last 3 days) [S192].

Based on the monitoring result, the controller 170 may determine whether the time, for which the image display device 100 is operated while the brightness of the backlight is 100% saturated, is equal to or greater than a first prescribed time (e.g., 12 hours) [S193]. Alternatively, the controller 170 may determine whether a rate of the time, for which the image display device 100 is operated while the brightness of the backlight is 100% saturated, over the time, for which a power of the image display device 100 is turned on, is equal to or greater than a first prescribed rate (e.g., 30%). If the time, for which the image display device 100 is operated while the brightness of the backlight is 100% saturated, is long, it may mean that the image display device 100 is installed in an environment in which the surroundings are bright.

As a result of the determination, if the time, for which the image display device 100 is operated while the brightness of the backlight is 100% saturated, is equal to or greater than the first prescribed time (or the first prescribed rate), the controller 170 may select another graph line instead of the selected graph line to reduce the time for which the backlight brightness is 100% saturated [S194].

For example, referring to FIG. 3, when a graph line currently selected is the graph line 2, the controller 170 may control the graph line 3 to be selected instead of the graph line 2. Accordingly, the image display device 100 may adjust the brightness of the backlight according to the brightness of the ambient light detected by the ambient light sensor based on the graph line 3 instead of the graph line 2, thereby reducing the time for which the backlight brightness is 100% saturated.

On the contrary, as a result of the determination, if the time, for which the image display device 100 is operated while the brightness of the backlight is 100% saturated, is smaller than the first prescribed time (or the first prescribed rate), the controller 170 may maintain the selected graph line (e.g., graph line 2) as it is [S196].

On the other hand, based on the monitoring result, the controller 170 may determine whether the time, for which the image display device 100 is operated while the brightness of the backlight is 100% saturated, is equal to or smaller than a second prescribed time (e.g., 1 hour) [S197]. Alternatively, the controller 170 may determine whether a rate of the time, for which the image display device 100 is operated while the brightness of the backlight is 100% saturated, over the time, for which a power of the image display device 100 is turned on, is equal to or smaller than a second prescribed rate (e.g., 3%). The second prescribed time may be shorter than the first prescribed time. The second prescribed rate may be smaller than the first prescribed rate. If the time, for which the image display device 100 is operated while the brightness of the backlight is 100% saturated, is too short, it may mean that the image display device 100 is installed in an environment in which the surroundings are dark.

As a result of the determination, if the time, for which the image display device 100 is operated while the brightness of the backlight is 100% saturated, is equal to or smaller than the second prescribed time (or the second prescribed rate), the controller 170 may select another graph line instead of the selected graph line to increase the time for which the backlight brightness is 100% saturated [S198].

For example, referring to FIG. 3, when a graph line currently selected is the graph line 2, the controller 170 may control the graph line 1 to be selected instead of the graph line 2. Accordingly, the image display device 100 may adjust the brightness of the backlight according to the brightness of the ambient light detected in real time by the ambient light sensor based on the graph line 1 instead of the graph line 2, thereby further increasing the time for which the backlight brightness is 100% saturated. This is to sufficiently reflect the change in the ambient light brightness sensed in real time by the ambient light sensor in the display brightness of the image display device.

On the contrary, as a result of the determination, if the time, for which the image display device 100 is operated while the brightness of the backlight is 100% saturated, is greater than the second prescribed time (or the second prescribed rate), the controller 170 may maintain the selected graph line (e.g., graph line 2) as it is [S196].

Here, "the change in the ambient light brightness sensed in real time" may literally mean an instantaneous change in ambient light brightness, or may mean a change in an average ambient light brightness over a very short time (e.g., several seconds or minutes) compared to the first prescribed time and the second prescribed time.

In some implementations, although the present disclosure is described above as a graph concept, it is a matter of course that a graph may be replaced with a corresponding table or formula.

Various aspects may be implemented using a machine-readable medium having instructions stored thereon for execution by a processor to perform various methods presented herein. Examples of possible machine-readable mediums include HDD (Hard Disk Drive), SSD (Solid State Disk), SDD (Silicon Disk Drive), ROM, RAM, CD-ROM, a magnetic tape, a floppy disk, an optical data storage device, the other types of storage mediums presented herein, and combinations thereof. If desired, the machine-readable medium may be realized in the form of a carrier wave (for example, a transmission over the Internet). The processor may include the controller 180 of the mobile terminal. The foregoing aspects are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary aspects described herein may be combined in various ways to obtain additional and/or alternative exemplary aspects.

What is claimed is:

1. An image display device comprising:
a display;
an ambient light detecting sensor; and
a controller configured to:
determine a brightness of the display according to an ambient light brightness detected in real time by the ambient light detecting sensor based on a first graph line for a display brightness over an ambient light brightness, and
determine whether to adjust the first graph line based on a time that the display has been operating at maximum brightness,
wherein, based on the time that the display has been operating at maximum brightness being equal to or smaller than a second prescribed time, the controller controls the first graph line to be changed to a third graph line to increase a future time that the display will operate at maximum brightness.

2. The image display device of claim 1,
wherein based on the time that the display has been operating at maximum brightness being equal to or greater than a first prescribed time, the controller controls the first graph line to be changed to a second graph line to decrease the future time that the display will operate at maximum brightness,
wherein the first prescribed time is longer than the second prescribed time.

3. The image display device of claim 1, wherein based on the time that the display has been operating at maximum brightness being smaller than a first prescribed time, the controller controls the first graph line to be maintained.

4. The image display device of claim 1, wherein based on the time that the display has been operating at maximum brightness being greater than the second prescribed time and less than the first prescribed time, the controller controls the first graph line to be maintained.

5. The image display device of claim 1, wherein the first to third graph lines are preconfigured to form an intersecting point at a single point below a maximum brightness of the display.

6. The image display device of claim 5, wherein the controller controls a user interface, which is to change a shape of at least one of the first graph line, the second graph line, or the third graph line by moving the intersecting point, to be displayed on the display.

7. The image display device of claim 6, wherein the controller controls a display brightness 100% saturated section of at least one of the first graph line, the second graph line, or the third graph line to be changed by moving the intersecting point.

8. The image display device of claim 7,
wherein based on moving the intersecting point in a first direction, the controller controls the saturated section of at least one of the first graph line, the second graph line, or the third graph line to increase, and
wherein based on moving the intersecting point in a second direction opposite to the first direction, the controller controls the saturated section of at least one of the first graph line, the second graph line, or the third graph line to decrease.

9. The image display device of claim 1, wherein the controller controls a second user interface, which is to select one of the first graph line, the second graph line, or the third graph line, to be displayed.

10. The image display device of claim 1, wherein the first to third graph lines are preconfigured to form intersecting points at two points below a maximum brightness of the display.

* * * * *